United States Patent
Cameron et al.

(10) Patent No.: US 10,653,138 B2
(45) Date of Patent: May 19, 2020

(54) COMPOSITION FOR ATTRACTING BED BUGS

(71) Applicants: London School of Hygiene & Tropical Medicine, London (GB); Rothamsted Research Limited, Harpenden, Hertfordshire (GB)

(72) Inventors: Mary McFadden Cameron, London (GB); James George Logan, Hertford (GB); Emma Natalie Ivy Weeks, Gainesville, FL (US); John Anthony Pickett, Hitchin (GB); Michael Alexander Birkett, Ware (GB)

(73) Assignees: London School of Hygiene & Tropical Medicine, London (GB); Rothamsted Research Limited, Harpenden, Hertfordshire (GB)

( * ) Notice: Subject to any disclaimer, the term of this patent is extended or adjusted under 35 U.S.C. 154(b) by 0 days.

(21) Appl. No.: 15/762,529

(22) PCT Filed: Oct. 4, 2016

(86) PCT No.: PCT/GB2016/053076
§ 371 (c)(1),
(2) Date: Mar. 22, 2018

(87) PCT Pub. No.: WO2017/060682
PCT Pub. Date: Apr. 13, 2017

(65) Prior Publication Data
US 2019/0059369 A1  Feb. 28, 2019

(30) Foreign Application Priority Data
Oct. 5, 2015 (GB) .................................. 1517546.6

(51) Int. Cl.
*A01N 35/02* (2006.01)
*A01N 37/02* (2006.01)
*A01N 35/04* (2006.01)
*A01N 31/02* (2006.01)
*A01N 27/00* (2006.01)

(52) U.S. Cl.
CPC ............. *A01N 35/02* (2013.01); *A01N 27/00* (2013.01); *A01N 31/02* (2013.01); *A01N 35/04* (2013.01); *A01N 37/02* (2013.01)

(58) Field of Classification Search
CPC ....... A01N 27/00; A01N 35/04; A01N 25/006
See application file for complete search history.

(56) References Cited

U.S. PATENT DOCUMENTS

| | | | |
|---|---|---|---|
| 2008/0168703 A1 | 7/2008 | Siljander et al. | |
| 2011/0072711 A1* | 3/2011 | Black .................. | A01M 1/2033 43/123 |
| 2012/0301532 A1 | 11/2012 | Carey et al. | |

FOREIGN PATENT DOCUMENTS

| | | | | |
|---|---|---|---|---|
| WO | WO 2005/096824 A1 | 10/2005 | | |
| WO | WO-2005096824 A1 * | 10/2005 | ............. | A01N 27/00 |
| WO | WO 2008/088546 A2 | 7/2008 | | |
| WO | WO-2008088546 A2 * | 7/2008 | ............. | A01M 1/24 |

OTHER PUBLICATIONS

Utah State University (https://extension.usu.edu/archive/cure-for-codling-moth-problems) Jun. 6, 2009, pp. 1-4 (Year: 2009).*
Siljander et al., "Identification of the Airborne Aggregation Pheromone of the Common Bed Bug, *Cimex lectularius*," *J Chem Ecol.* 34:708-718, 2008.
Singh et al., "Interactions among Carbon Dioxide, Heat, and Chemical Lures in Attracting the Bed Bug, *Cimex lectularius* L. (Hemiptera: Cimicidae)," *Psyche* 17:61-69, 2012.
Weeks et al., "Semiochemicals of the Common Bed Bug, *Cimex lectularius* L. (Hemiptera: Cimicidae), and their Potential for use in Monitoring and Control," *Pest Manag Sci.* 67:10-20, 2011.
GB 1517546.6 Search Report dated Mar. 29, 2016 (5 pages).
PCT/GB2016/053076 International Search Report and Written Opinion dated Feb. 28, 2017 (18 pages).
PCT/GB2016/053076 International Preliminary Report on Patentability dated Feb. 5, 2018 (12 pages).
Gries et al., "Bed Bug Aggregation Pheromone Finally Identified," *Angew Chem Int Ed.* 54:1135-1138, 2015.
Weeks et al., "A bioassay for studying behavioural responses of the common bed bug, *Cimex lectularius* (Hemiptera: Cimicidae) to bed bug-derived volatiles," *Bull Entomol Res.* 101:1-8, 2011.
Weeks et al., "Tracking bed bugs (*Cimex lectularius*): a study of the effect of physiological and extrinsic factors on the response to bed bug-derived volatiles," *J Exp Biol.* 216:460-469, 2013.

* cited by examiner

*Primary Examiner* — Andrew S Rosenthal
(74) *Attorney, Agent, or Firm* — Klarquist Sparkman, LLP

(57) ABSTRACT

The present invention provides compounds for attracting bed bugs, compositions thereof, devices comprising said compositions and their use in the detection, monitoring and control of bed bugs.

15 Claims, 12 Drawing Sheets

COMPOSITION FOR ATTRACTING BED BUGS

CROSS REFERENCE TO RELATED APPLICATIONS

This is the U.S. National Stage of International Application No. PCT/GB2016/053076, filed Oct. 4, 2016, which was published in English under PCT Article 21(2), which in turn claims the benefit of GB 1517546.6, filed Oct. 5, 2015.

The present invention provides compounds for attracting bed bugs, compositions thereof, devices comprising said compositions and their use in the detection, monitoring and control of bed bugs.

All publications, patents and patent applications cited herein are incorporated in full by reference.

Bed bugs (Cimicidae) have been biting people since the beginning of recorded time. The common bed bug, *Cimex lectularius*, which feeds upon human blood, has a worldwide distribution, being present almost everywhere that human beings have colonised. The biting nuisance caused by an infestation can have physical and mental effects on the human host. Blood feeding can result in allergic reactions to vasodilatory substances in the bed bug saliva and insect bite wounds can become infected by opportunistic pathogens, if inappropriately treated or in immuno-compromised individuals. Furthermore, realisation of a domestic bed bug infestation can affect mental health, causing a range of problems, including emotional distress, anxiety, insomnia and paranoia.

Bed bugs are also of veterinary importance and can be associated with bird and bat hosts. Poultry farms are widely affected, where bed bugs are an important pest of chickens. Complex consequences in poultry farms include loss of productivity via the allergic reactions by workers, reduced egg value due to bug faecal spots, lower egg production from affected chickens and increased feed consumption.

For most of the past 40 years, *C. lectularius* has been an unimportant pest in developed countries. However, in recent years, these bed bugs have re-emerged as a significant global pest, with outbreaks occurring in North America, Europe, Australia and elsewhere. The banning of certain insecticides, resistance to other insecticides and the increase in international travel are cited as the main reasons for the re-emergence of this pest problem. Bed bug infestations have a large impact on the hotel and hospitality industry which can be extremely costly. In the US, it is reported to represent around 20% of the US$4 billion extermination insect and pest control services sector. It has grown to be the third largest segment of this market.

Monitoring of bed bug infestations, both spatially and temporally, is essential for the development of targeted insecticide treatments. Early detection of bed bug activity is acknowledged as a key factor in reducing the disruption, cost and effort of remedial treatment. The monitoring of bed bug populations can also be used to assess the efficacy of remedial and preventative treatment.

Many currently available devices, such as sticky traps, are based on the principle of random interception and are not efficient at monitoring or controlling bed bug populations. Bed bugs will preferentially crawl under them, and they are not sufficiently sensitive to detect low-level infestations. In addition, these traps are not attractive in themselves, and so a person is required to sleep in the infested room as bait. Refuge-type monitors detect the presence of a bed bug infestation if the insects use the device as a temporary or permanent refuge. However, as with interceptive devices, these will be unlikely to detect low-level infestations. Traps that claim to attract bed bugs currently on the market use either heat or chemical lures or both. However, there are few scientific studies that have tested the efficacy of these devices. Some devices use $CO_2$ to attract bed bugs. However, traps baited with $CO_2$ are expensive and their maintenance is time consuming. Therefore, it is unlikely that such a device would be suitable for long term, wide scale bed bug surveillance. Furthermore, there are safety issues associated with the use of pressurised gas and/or chemical reactions for the production of $CO_2$.

Recent research has therefore begun to focus on the use of volatile semiochemicals for the attraction of bed bugs. However, progress in this regard has been limited. A study investigated potential airborne semiochemicals of *C. lectularius* (Siljander et al (2008) *J. Chem. Ecol.* 34: 708-718). Volatile extracts were collected from experimental bed bugs refuges by air entrainment and were fractionated and tested in a dual-choice bioassay. Through a process of elimination, a synthetic blend of 10 possible pheromone components was determined and then tested using a bioassay. However, the synthetic blend was not attractive over a longer range (30 cm). A further recent study reported that the bed bug aggregation pheromone was contact specific and comprises five volatile components (dimethyl disulfide, dimethyl trisulfide, (E)-2-hexenal, (E)-2-octenal, 2-hexanone), which attract bed bugs to safe shelters, and one less-volatile component (histamine), which causes their arrestment upon contact (Gries et al Angew. Cem. Int. Ed. 2015 54 1135-1138.

With the high and increasing global prevalence of the common bed bug, compositions and devices for the detection, monitoring and control of bed bug infestations that are effective, sustainable, affordable and acceptable in the domestic environment are urgently required. There is a particular need for attractant compositions which are capable of being detected by bed bugs from a distance, without the need for direct contact with the source of the volatiles, and capable of attracting bed bugs to facilitate aggregation.

The inventors have discovered a discrete group of compounds which are detected by bed bugs using antennal olfaction and effectively function to attract bed bugs. As described in Examples 1 and 2, coupled gas chromatography-electroantennography (GC-EAG) was used for the first time to identify compounds which are perceived by olfactory receptors on bed bug antennae. Hexanal, heptanal, benzaldehyde, (RS)-1-octen-3-ol, octanal, 3-carene, β-phellandrene, (E)-2-octenal, (3E, 5E)-octadien-2-one, nonanal, (E)-2-nonenal, 2-decanone, decanal, dodecane, nonanoic acid, 2-(2-butoxyethoxy)ethyl acetate, (E)-2-undecenal and (S)-(−)-germacrene D all produced consistent electroantennogram (EAG) responses and are hence deemed to be EAG-active or physiologically active.

A first aspect of the present invention therefore provides a composition comprising or consisting of (E)-2-octenal and nonanal.

Preferably, the composition comprises or consists of (RS)-1-octen-3-ol, (E)-2-octenal and nonanal.

During the development of the compositions of the present invention, the inventors identified 13 compounds which had not previously been identified as bed bug aggregation semiochemicals; hexanal, heptanal, (RS)-1-octen-3-ol, 3-carene, β-phellandrene, (3E, 5E)-octadien-2-one, (E)-2-nonenal, 2-decanone, dodecane, nonanoic acid, 2-(2-butoxyethoxy)ethyl acetate, (E)-2-undecenal and (S)-(−)-germacrene D.

Thus preferably, the composition comprises one or more compounds selected from the group consisting of hexanal, heptanal, (RS)-1-octen-3-ol, 3-carene, β-phellandrene, (3E, 5E)-octadien-2-one, (E)-2-nonenal, 2-decanone, dodecane, nonanoic acid, 2-(2-butoxyethyoxy)ethyl acetate, (E)-2-undecenal and (S)-(−)-germacrene D.

Additionally, or alternatively, said composition comprises or consists of benzaldehyde, octanal and decanal.

Therefore, in a preferred embodiment of the first aspect, the composition comprises any two or more or three or more compounds selected from the afore groups.

The structures of these compounds are set out in Table 1, below.

TABLE 1

Structures of EAG-active compounds

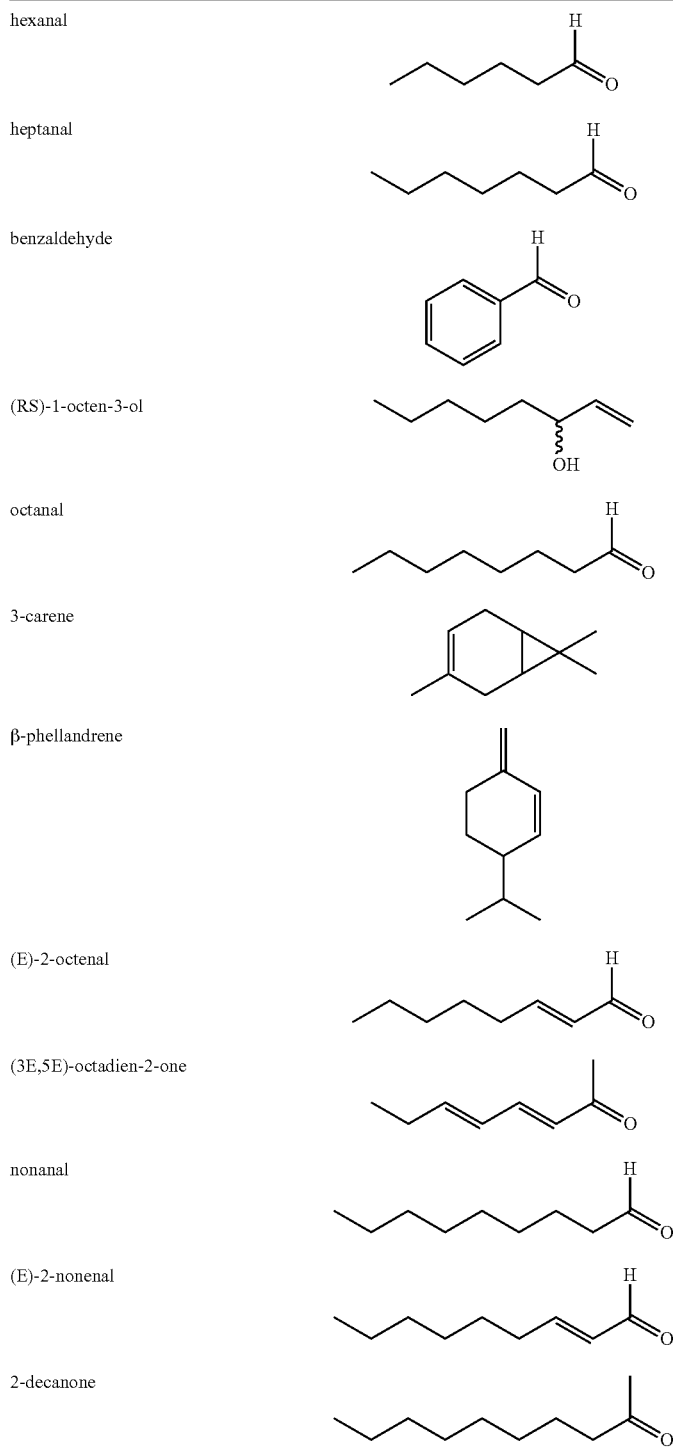

TABLE 1-continued

Structures of EAG-active compounds decanal dodecane nonanoic acid 2-(2-butoxyethoxy)ethyl acetate (E)-2-undecenal (S)-(−)-germacrene D In a particularly preferred embodiment, the composition comprises hexanal, heptanal, benzaldehyde, (RS)-1-octen-3-ol, octanal, 3-carene, β-phellandrene, (E)-2-octenal, nonanal, (E)-2-nonenal, 2-decanone, decanal, dodecane, nonanoic acid, 2-(2-butoxyethoxy)ethyl acetate and (E)-2-undecenal. As discussed in Example 4, an exemplary composition consisting of the 16 compounds identified above was found to attract bed bugs in behavioural experiments.

In another particularly preferred embodiment, the composition comprises hexanal, heptanal, benzaldehyde, (RS)-1-octen-3-ol, octanal, 3-carene, β-phellandrene, (E)-2-octenal, (3E, 5E)-octadien-2-one, nonanal, (E)-2-nonenal, 2-decanone, decanal, dodecane, nonanoic acid, 2-(2-butoxyethoxy)ethyl acetate, (E)-2-undecenal and (S)-(−)-germacrene D. As discussed in Example 4, an exemplary composition consisting of the 18 compounds identified above was found to attract bed bugs in behavioural experiments.

In a particularly preferred embodiment, the composition comprises (E)-2-octenal, and nonanal and, optionally, (RS)-1-octen-3-ol. As discussed in Example 7, an exemplary composition consisting of the 2 or 3 compounds identified above was found to be responsible for attracting bed bugs in behavioural experiments.

Moreover, in our primary composition we found that the concentration of (E)-2-octenal, with respect to the amount present in the standard of natural volatiles, should be greater than the concentration of nonanal in said same standard, indeed the effective concentrations for these compounds were as follows. (E)-2-octenal at doses greater than 10 times nonanal, ideally greater than 100 times nonanal and more preferably a thousand times greater than nonanal. We are referring here to either 10×, 100× or 1000× the dose of (E)-2-octenal found naturally in the aggregation pheromone compared with 1× the dose of nonanal found naturally in the aggregation pheromone.

The composition according to the first aspect of the present invention may also consist of the compounds or combinations of compounds disclosed above.

Preferably, the composition according to the first aspect does not comprise one or more compounds selected from the group consisting of (E)-2-hexanal, (E, E)-2,4-octadienal, (E, Z)-2,4-octadienal, benzyl acetate, benzyl alcohol, (+)-limonene, (−)-limonene, sulcatone and geranylacetone.

The composition may comprise one or more additional active agents, including but not limited to other bed bug semiochemicals, in particular attractant or aggregation pheromones or contact pheromones.

Suitable carriers and/or diluents are well known in the art and include ethanol and diethyl ether. The formulation may also comprise suitable additives, for example a preservative.

The composition is preferably a synthetic composition or blend, separate from a bed bug. The composition may be an isolated composition, or may comprise isolated compounds.

Preferably the composition is a bed bug attractant composition and/or an aggregation pheromone for bed bugs.

A second aspect of the present invention provides the use of the composition according to the first aspect of the present invention for attracting bed bugs.

The compositions according to the first aspect of the present invention are thought to lure active bed bugs by imitating a bed bug refuge. When the composition evaporates or is otherwise released, it disperses into the surroundings and is detected by antennal olfaction by the bed bugs, which follow the scent to the source of the molecule. Thus, direct contact with the composition is not required, and the composition is attractive from a distance. Preferably, the composition is attractive over a distance of at least 10 cm, at least 20 cm, at least 30 cm, at least 40 cm, at least 50 cm, at least 60 cm, at least 70 cm, at least 80 cm, at least 90 cm, including all 1 cm intervals there between, or at least 1 m from the composition.

The composition may attract male and female, mated and unmated (virgin), adult and juvenile, fed and unfed bed bugs.

The composition may be used to aggregate bed bugs, to detect bed bugs, to monitor bed bug populations, to trap bed bugs and to monitor the efficacy of treatments against bed bug infestations.

The composition may be used as bait in a pheromone baited trap that could be used for bed bug detection, monitoring and control.

The compositions may be used to reduce or eliminate bed bug populations, in particular when used in combination with a bed bug toxin or pathogen as part of an integrated pest management system. In one embodiment, the composition may be used in combination with a pathogen. Any bed bugs attracted to the composition are then infected with the pathogen, which is then spread through the bed bug population by the infected bed bugs. In an alternative embodiment, the composition may be used to attract bed bugs to a surface treated with a bed bug toxin. The toxin used can be an appropriate toxin optimized for the specific bed bug population of interest. Examples of suitable insecticides include carbamates such as bendiocab and pyrethroids such as cyfluthrin, permethrin and deltamethrin. Bed bugs have developed behavioural resistance to some insecticides. For example, bed bugs have evolved enhanced locomotor activity and avoidance behaviour in response to synthetic pyrethroid (deltamethrin). It has been observed that volatile semiochemicals from refugia attract bed bugs, despite the presence of unattractive insecticidal volatile compounds. Therefore, the application of the novel semiochemicals with insecticides could overcome the behavioural resistance to the insecticides and increase their efficacy. Preferably, the composition of the present invention functions to attract the bed bugs to the treated area, whereupon the bed bugs come into contact with the insecticide or other suitable toxin.

The composition may also be used to train "sniffer dogs" to detect the presence and location of infestations of bed bugs.

Further details regarding these uses are provided below in relation to the third and fourth aspect of the present invention.

A third aspect of the present invention provides a method of attracting bed bugs comprising the step of providing a composition according to the first aspect of the present invention.

Bed bugs may be attracted to a desired location by locating the composition in the desired location. The desired location may comprise, for example, a room, region thereof or item of furniture such as a bed, in which the detection of a bed bug infestation is desired or in which the reduction or elimination of a bed bug infestation is required.

The composition is preferably provided in such a way that evaporation or release of the volatile compounds into the air is facilitated. For example, the composition may be volatised either by exposure to ambient temperatures, by warming the composition, by air movement or by a combination thereof.

In one embodiment, the method of the third aspect is for the detection of bed bugs. In this embodiment, the method preferably comprising the steps of:

1) providing a composition according to the first aspect of the present invention to attract the bed bugs; and
2) detecting any bed bugs attracted to said composition.

Attraction of the bed bugs to the composition will result in aggregation of the bed bugs within the vicinity of the composition, and will thus facilitate the detection of bed bugs which may otherwise be widely dispersed or congregated within inaccessible refuges. By attracting bed bugs towards the composition, bed bugs may be detected even at low population levels, providing an early warning of infestation.

The bed bugs may be detected visually, for example by looking for the bed bugs themselves, or other indicia including exuvia, blood spots, faeces or ova within the vicinity of the composition. This may be aided by the provision of a high-contrast material, known to those skilled in the art. The vicinity of the composition may comprise a trap in which the composition has been placed or a defined "trap zone" encircling the composition.

Bed bug populations, and hence infestations, may be monitored by detecting bed bugs at repeated time intervals. Bed bug populations may be monitored by performing the steps of:

1) providing a composition according to the first aspect of the present invention to attract the bed bugs;
2) detecting any bed bugs attracted to said composition; and
3) repeating step 2) after a selected time interval.

In one embodiment, both step 1) and step 2) are repeated after a selected time interval. Repetition of this method may be continued for as long as monitoring is desired.

The selected time interval will depend upon, for example, the length of time over which any variables affecting bed bug population may be expected to act, and the length of the monitoring program. Exemplary time intervals include 1 day, 2 days, 3 days, 4 days, 5 days, 6 days, one week, two weeks, three weeks, one month, two months or three months.

The number of bed bugs attracted to the composition may be counted in order to provide a measure of any increases or decreases in the bed bug population. In order to provide results which are comparable between repetitions, and between monitoring programs, quantitative measurements of bed bugs may be limited to those present within a trap or other demarcated "trap zone".

The monitoring of bed bug populations over time can be used to assess or measure the efficacy of treatment for bed bug infestation. Thus, the efficacy of treatment for bed bug infestation may be assessed by performing the steps of:

1) providing a composition according to the first aspect of the present invention to attract the bed bugs; and
2) detecting any bed bugs attracted to said composition; wherein steps 1) and 2) are performed pre-treatment, and step 2) is repeated post-treatment.

In one embodiment, both steps 1) and 2) are repeated post-treatment.

Preferably, the number of bed bugs attracted to the composition is counted pre-treatment and post-treatment. The number of bed bugs attracted to the composition pre-treatment and post-treatment can then be compared to assess the efficacy of the treatment.

Preferably, the treatment is remedial treatment for the reduction or elimination of existing bed bug infestations.

The method of the third aspect may also be used to reduce or eliminate a bed bug population or infestation. In one embodiment, the method comprises the steps of:

1) providing a composition according to the first aspect of the present invention to attract bed bugs to a trapping means; and
2) trapping said bed bugs with said trapping means.

The trapping means may comprise any suitable means for physically restraining bed bugs attracted to the composition according to the first aspect. The trapping means may comprise an adhesive which physically restrains bed bugs which come into physical contact with said trapping means. Alternatively, the trapping means may comprising a housing into which the composition is placed, wherein the housing is designed to enable bed bugs to enter the housing easily, but designed such that the bed bugs have difficulty leaving.

In another embodiment, the method for reduction or elimination of a bed bug infestation comprises the steps of:

1) providing a composition according to the first aspect of the present invention to attract bed bugs; and
2) contacting said bed bugs with a bed bug pathogen.

The pathogen may be selected from the group comprising bacteria, viruses or fungi. In a particularly preferred option, the pathogen is an entomopathogenic fungi. The pathogens may cause rapid mortality of the bed bugs attracted to the composition according to the first aspect of the present invention. Alternatively, mortality may be delayed such that the bed bugs brought into contact with the pathogen spread the pathogen amongst the bed bug population and/or contaminate the bed bug refuge.

In a further embodiment, the method for reduction or elimination of a bed bug infestation comprises the step of providing a composition according to the first aspect of the present invention to attract bed bugs to a surface treated with a toxin. Preferably, the composition is located on the surface treated with the toxin.

As described above, the composition can be used to overcome behavioural resistance to certain bed bug toxins, and hence increase the efficacy of the toxin at reducing or eliminating bed bug infestations. The toxin may comprise an insecticide or other substance toxic to bed bugs. The toxin used can be any appropriate toxin optimized for the specific bed bug population of interest. Examples include carbamates such as bendiocarb and pyrethroids such as cyfluthrin, permethrin and deltamethrin.

A fourth aspect of the present invention provides a device for attracting bed bugs comprising an attractant element, wherein the attractant element comprises the composition according to the first aspect of the present invention.

The incorporation within the device of a composition which is attractive from a distance without the use of $CO_2$ is a significant improvement on prior art devices which require $CO_2$ to achieve attraction. As stated above, traps baited with $CO_2$ are expensive and their maintenance is time consuming. Furthermore, there are safety issues associated with the use of pressurised gas and/or chemical reactions for the production of $CO_2$. The device of the present invention is safe, non-toxic and can be manufactured at a reasonable cost. The device can be inconspicuous and simple to use, and is therefore suitable for domestic use. With the low level of maintenance required for such a trapping technique, the device of the present invention is suitable for wide-scale, long term surveillance and may be effective at detecting low level infestations.

The attractant element preferably comprises a substrate which functions to contain and release the composition according to the first aspect. The substrate may comprise filter paper, rubber septa, fibres made of a plastic-like material, such as polyethylene, polypropylene, olefin or similar materials, laminate flakes and microcapsules.

The rubber septa can be impregnated with the composition according to the first aspect of the present invention and the composition gradually released from the rubber septa over several weeks.

The fibres are preferably hollow and sealed at one end and can be filled with the composition according to the first aspect of the present invention. The plastic is impermeable to the composition of the invention and release occurs by evaporation from the liquid-air interface followed by diffusion through the tube to the open end.

Laminate fibres preferably comprise a central porous layer, which can contain the composition according to the first aspect of the present invention sandwiched between two permeable vinyl layers. The compositions of the invention would be released from the flake following diffusion through the vinyl layers. The release rate can be controlled by varying the thickness of the layers.

Microencapsulation formulations are preferably made up of microcaps that comprise the composition according to the first aspect of the present invention enclosed by a plastic polymeric layer. The release of the composition can be controlled by altering the chemical composition of the microcap, the microcap thickness and the size of the microcap.

The rate of release from all controlled release formulations will also be influenced by environmental factors such as temperature, humidity, prevailing air currents and other local micro-climate parameters.

The device preferably comprises a housing which encloses and/or supports the attractant element. Preferably, the housing comprises one or more openings to enable the bed bugs to enter the housing. To improve the chances of bed bug entry, the openings are preferably narrow to replicate the contact stimuli of a bed bug entering a refuge, e.g. crack or crevice. Bed bugs are positively thigmotactic, in that they prefer to be in contact with surfaces or conspecifics upon entering and within the refuge. In addition to replicating the chemical and physical profile of a refuge, the housing may also attempt to replicate the microclimate of a refuge. For example, the humidity and/or temperature inside the device may be controlled by physical manipulation or other means to accurately imitate a bed bug refuge. In this way, bed bugs can be encouraged to use the device as a temporary or permanent refuge, facilitating their detection.

The device may additionally comprise a trapping means to retain any bed bugs attracted to the composition within the device. The trapping means may comprise an adhesive which physically restrains bed bugs which enter the device. Alternatively, the trapping means may comprise a housing designed to enable bed bugs to enter the device easily, but designed such that the bed bugs have difficulty leaving. As such, the device of the present invention may function as a bed bug trap.

The device may be a detection or monitoring device. In this respect, it may be used to detect a bed bug infestation and to monitor a bed bug infestation both spatially and temporally. By such means, the device may provide an early warning system for potential infestation, or allow the assessment of the efficacy of remedial treatments.

The device of the present invention may be a control device for the reduction, suppression or elimination of bed bug infestation.

In one embodiment, the control device comprises a trapping means as discussed above. The trapping means traps bed bugs within the device and thereby functions to reduce, suppress or eliminate a bed bug infestation.

In another embodiment, the device comprises a bed bug pathogen which increases bed bug mortality and morbidity. Preferably, the pathogen is selected from the group comprising bacteria, viruses or fungi. In a particularly preferred option, the pathogen is an entomopathogenic fungi. The pathogens may cause rapid mortality within the device or in the immediate vicinity of the device. Alternatively, mortality may be delayed such that, upon leaving the device, the infected bed bugs spread the pathogen amongst the population. As such, the device may function as an autodissemination device which facilitates control of the remainder of the population which do not visit the device.

The control device may form part of an integrated pest management system. For example, the device of the present invention can be used to attract the bed bugs to a surface treated with a bed bug toxin, whereupon the bed bugs come into contact with the toxin. The toxin may comprise an insecticide or other substance toxic to bed bugs. The device can therefore be used to overcome behavioural resistance to certain toxins such as insecticides, and thus increase the efficacy of these toxins.

During the development of the compositions of the present invention, the inventors identified 13 compounds which had not previously been identified as bed bug aggregation semiochemicals; hexanal, heptanal, (RS)-1-octen-3-ol, 3-carene, β-phellandrene, (3E, 5E)-octadien-2-one, (E)-2-nonenal, 2-decanone, dodecane, nonanoic acid, 2-(2-butoxyethyoxy)ethyl acetate, (E)-2-undecenal and (S)-(−)-germacrene D.

A fifth aspect of the present invention therefore provides the use of a compound selected from the group consisting of hexanal, heptanal, (RS)-1-octen-3-ol, 3-carene, β-phellandrene, (3E, 5E)-octadien-2-one, (E)-2-nonenal, 2-decanone, dodecane, nonanoic acid, 2-(2-butoxyethyoxy)ethyl acetate, (E)-2-undecenal and (S)-(−)-germacrene D for attracting bed bugs.

The fifth aspect of the present invention also provides the use of a composition comprising, consisting of, or consisting essentially of, one or more compounds selected from the group consisting of hexanal, heptanal, (RS)-1-octen-3-ol, 3-carene, β-phellandrene, (3E, 5E)-octadien-2-one, (E)-2-nonenal, 2-decanone, dodecane, nonanoic acid, 2-(2-butoxyethyoxy) ethyl acetate, (E)-2-undecenal and (S)-(−)-germacrene D for attracting bed bugs.

The compounds or compositions of the invention may be used, for example, to aggregate bed bugs, to detect bed bugs, to monitor bed bug populations, to trap bed bugs and to monitor the efficacy of treatments against bed bug infestations. The compounds and composition may be used as bait in a pheromone baited trap that could be used for bed bug detection, monitoring and control. The compounds and compositions may be used to reduce or eliminate bed bug populations, in particular when used in combination with a bed bug toxin or pathogen as part of an integrated pest management system. The compounds and composition may also be used to train "sniffer dogs" to detect the presence and location of infestations of bed bugs. Details of the use according to the second aspect of the present invention apply mutatis mutandis to the use according to the fifth aspect of the present invention.

As used herein, the term "bed bug" denotes insects in the family Cimicidae, and preferably *Cimex* spp. A particularly preferred *Cimex* spp is *Cimex lectularius*, the common bed bug. However, the compounds and compositions of the present invention are also provided for use with other *Cimex* spp, including *Cimex hemipterus*, the tropical bed bug. *Leptocimex boueti* also occasionally feeds on humans and could be a target for the present invention. Other insects that feed on blood and use faecal material to mark their refuges could also be attracted to the composition, e.g. *Triatominae* sp, the vectors of American trypanosomiasis, *Trypanosoma cruzi*. The compounds, compositions and devices of the present invention can therefore be used to attract other blood-feeding hemiptera.

According to a further aspect, or embodiment, of the invention there is provided a composition comprising or consisting of a compound selected from the group comprising: L-valine, L-glycine, L-histidine, histamine, dimethyl aminoethanol,3-hydroxykynurenine-O-sulphate and a steroid, including any combination thereof.

In a preferred embodiment of the afore recited compositions, uses, methods or devices of the invention the composition can be further supplemented with a compound selected from the group comprising. L-valine, L-glycine, L-histidine, histamine, dimethyl aminoethanol,3-hydroxykynurenine-O-sulphate and a steroid, including any combination thereof.

Accordingly, the above compositions have utility in the aggregation of bed bugs.

In the claims which follow and in the preceding description of the invention, except where the context requires otherwise due to express language or necessary implication, the word "comprises", or variations such as "comprises" or "comprising" is used in an inclusive sense i.e. to specify the presence of the stated features but not to preclude the presence or addition of further features in various embodiments of the invention.

All references, including any patent or patent application, cited in this specification are hereby incorporated by reference. No admission is made that any reference constitutes prior art. Further, no admission is made that any of the prior art constitutes part of the common general knowledge in the art.

Preferred features of each aspect of the invention may be as described in connection with any of the other aspects.

Other features of the present invention will become apparent from the following examples. Generally speaking, the invention extends to any novel one, or any novel combination, of the features disclosed in this specification (including the accompanying claims and drawings). Thus, features, integers, characteristics, compounds or chemical moieties described in conjunction with a particular aspect, embodiment or example of the invention are to be understood to be applicable to any other aspect, embodiment or example described herein, unless incompatible therewith.

Moreover, unless stated otherwise, any feature disclosed herein may be replaced by an alternative feature serving the same or a similar purpose.

Throughout the description and claims of this specification, the singular encompasses the plural unless the context otherwise requires. In particular, where the indefinite article is used, the specification is to be understood as contemplating plurality as well as singularity, unless the context requires otherwise.

An embodiment of the present invention will now be described by way of example only with reference to the following wherein:

FIGURES

FIG. 1 is an illustration of the air entrainment equipment used to collect volatiles from bed bug-exposed papers.

FIG. 2 is a coupled gas chromatography-electroantennography (GC-EAG) trace of *Cimex lectularius* (female) responses to a bed bug-exposed paper volatile extract. The top trace corresponds to the flame ionisation detector (FID) on the GC and the bottom trace corresponds to the antennal response of the insect preparation. Labelled peaks were EAG-active in five or more of the 20 insects tested (peak 1–21).

FIG. 3 is an illustration of the still-air olfactometer used to investigate bed bug behaviour in response to bed bug-derived volatiles and synthetic blends. Side and plan view, internal diameter 190 mm, hole diameter 26 mm, distance between holes 64 mm, distance to edge 32 mm. Pots were plastic and measured 60×40 mm. Odour pot contains bed bug-exposed paper. No-odour pot contains clean unexposed filter paper.

FIGS. 4(A) and 4(B) shows background EthoVision® images showing the arena and two zone definitions. FIG.

4(A) shows Zone 1 and 2 (two sides of the arena) and FIG. 4(B) shows zone A and B (areas directly above pots).

FIGS. 5A and 5B shows the effect of the volatiles from bed bug-exposed paper on the behaviour of *Cimex lectularius* of different sex, mating status and life stage in Still-air olfactometer II. Bars represent the mean differences in FIG. 5(A) visits to pots (SED 2.551 visits), FIG. 5(B) time spent in zones (s, SED 168 s) between odour and no-odour pots and zones, respectively. Means±standard errors. F-test FIG. 5(A) $F_{3,83}$=0.53, P=0.665 and FIG. 5(B) $F_{3,95}$=1.08, P=0.363.

FIGS. 6(A) and 6(B) shows the effect of increasing dose of the volatile extract from bed bug-exposed paper on the behaviour of *Cimex lectularius* in the Still-air olfactometer II. Doses tested: 0.02% (EXT 1), 0.2% (EXT 2) and 2% (EXT 3), respectively. The response due to a positive control of bed bug-exposed paper (BBEXP) and a negative control of solvent (re-distilled diethyl ether) are shown for comparison. Bars represent mean differences in FIG. 6(A) visits to pots (SED 1.193 visits), and FIG. 6(B) time spent in zones (s, SED 109.2 s) between odour and no-odour pots and zones, respectively. Means±standard error; bars labelled 'a or b' are significantly different (at the 5% level) from the negative or positive control, respectively.

FIGS. 7(A) and 7(B) show the effect of dose of volatile extract and SB-16 on the behaviour of *Cimex lectularius* in still-air olfactometer II using; (i) filter paper treated with redistilled diethyl ether (Control); (ii) Bed bug exposed papers (BBEXP); (iii) Volatile extracts from Bed bug exposed papers, 2% solution (EXT 3), (iv) Volatile extracts from Bed bug exposed papers, 4% solution (EXT 4); (v) Volatile extracts from Bed bug exposed papers, 8% solution (EXT 5); (vi) SB-16, 2% solution (SB3); (vii) SB-16, 4% solution (SB4); and (viii) SB-16, 8% solution (SB5). Bars represent mean differences in FIG. 7(A) visits to pots (SED 1.428 visits), and FIG. 7(B) time spent in zones (s, SED 206.5 s) between odour and no-odour pots and zones, respectively. Means±standard error; bars labelled 'a or b' are significantly different (at the 5% level) from the negative or positive control, respectively.

FIGS. 8(A) and 8(B) show the effect of different volatile treatments on the behaviour of *Cimex lectularius* in the still-air olfactometer using: (i) filter paper treated with redistilled diethyl ether (Control paper); (ii) Bed bug exposed papers (BBEXP); (iii) Volatile extracts from Bed bug exposed papers, 8% solution applied to filter paper (EXT 8%); (iv) SB-18, 8% solution applied to filter paper (SB 8%); (v) SB-18, applied to rubber septa at a concentration equivalent to 8% release (Setpa_2); (vi) SB-18, applied to rubber septa at a concentration 5 times that of Septa_2 (Setpa_1); (vii) SB-18, applied to rubber septa at a concentration 5 times more dilute that of Septa_2 (Setpa_3); and (viii) Rubber septa treated with redistilled diethyl ether (Control septa). Bars represent mean differences in FIG. 8(A) visits to pots (SED 1.126 visits), and FIG. 8(B) time spent in zones (s, SED 174.3 s) between odour and no-odour pots and zones, respectively. Means±standard error; bars labelled 'a or b' are significantly different (at the 5% level) from the corresponding negative controls.

FIG. 9 shows time spent above pots (odour-no odour) for the dose response of the 18-component synthetic blend. BBEXP=Bed bug-exposed paper and UNEXP=Unexposed paper. * indicate significant compared to respective negative control.

FIG. 10 shows time spent in zones (odour-no odour) for the 18 blends each with one chemical subtracted. Each blend is named after the chemical that has been subtracted. BBEXP=Bed bug-exposed paper. * indicate significant compared to respective negative control.

TABLES

Figure 1:
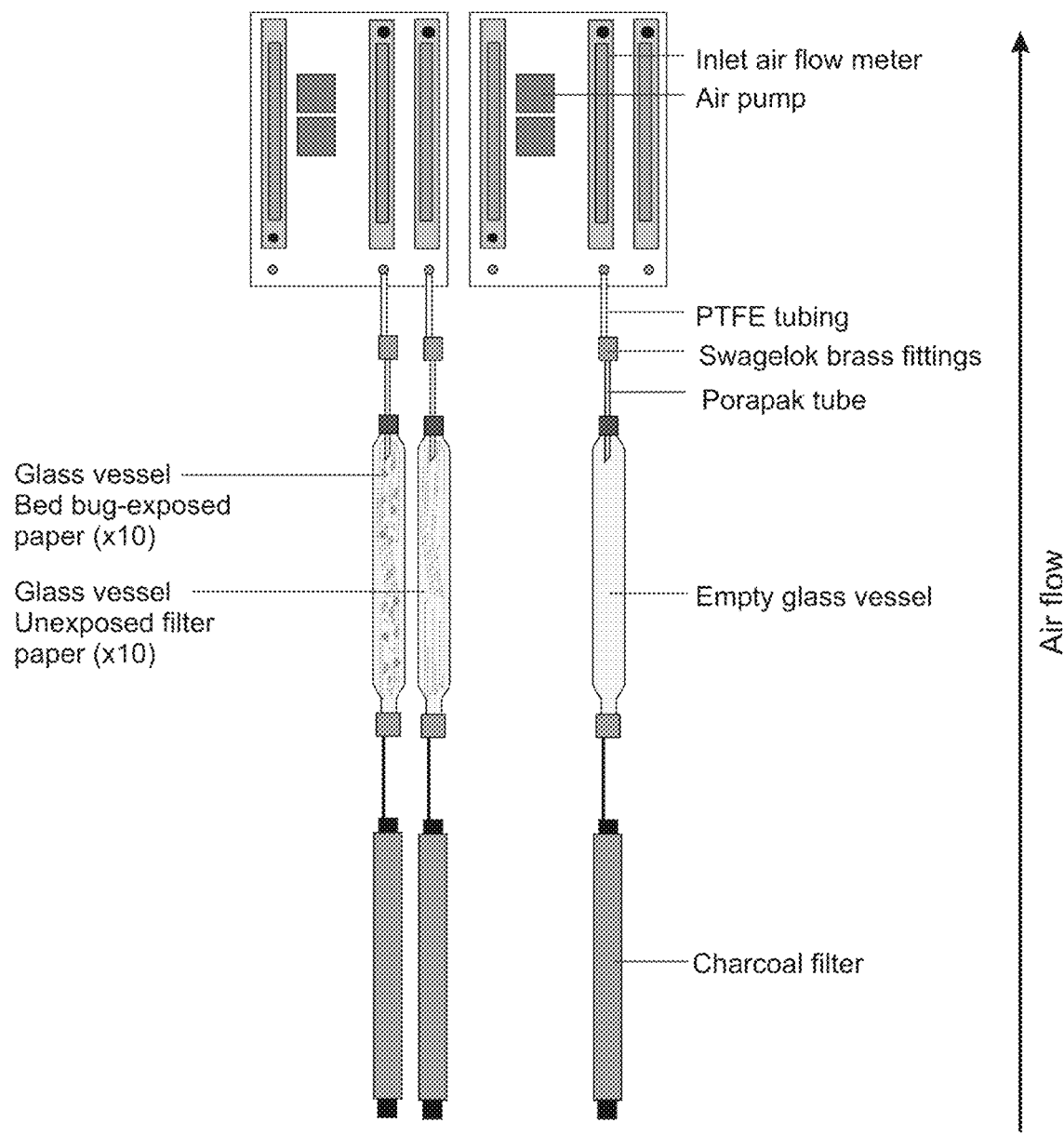

Table 1: Structures of EAG-active compounds.

Table 2: Coupled gas chromatography-electroantennography (GC-EAG) responses of bed bugs to a volatile extract from bed bug-exposed paper. For each EAG-active peak the retention time (RT), retention index (RI) and the number of responses in males and females and the total responses is given.

Table 3: Composition of volatile extract collected by air entrainment.

Table 4: First choice of *Cimex lectularius* in Still-air olfactometer II in response to the volatile extract. Volatile extract (EXT) tested at three doses, 1, 2 and 3 (0.02, 0.2 and 2%). The number of individuals visiting the odour pot (O pot) and the no-odour pot (NO pot) first is given along with the number and proportion of bed bugs that made no choice, i.e. no visits to either pot (NC and Prop-NC respectively). The proportion of bed bugs that visited the odour pot first was calculated as a proportion (Prop-O pot).

Table 5: Composition of synthetic blends SB-16 and SB-18.

Table 6: First choice of *Cimex lectularius* in Still-air olfactometer II in response to a volatile extract and a 16-component synthetic blend. Volatile extracts (EXT) and synthetic blends (SB) at three doses, 3, 4 and 5 (2, 4 and 8% respectively). The number of individuals visiting the odour pot (O pot) and the no-odour pot (NO pot) first is given along with the number and proportion of bed bugs that made no choice, i.e. no visits to either pot (NC and Prop-NC respectively). The proportion of bed bugs that visited the odour pot first was calculated as a proportion (Prop-O pot).

Table 7: First choice of *Cimex lectularius* in the Still-air olfactometer in response to different treatments, bed bug-exposed paper, volatile extract and synthetic blend applied to filter paper, and three doses of synthetic blend applied to rubber septa with their corresponding controls. The number of individuals visiting the odour pot (O pot) and the no-odour pot (NO pot) first is given along with the number and proportion of bed bugs that made no choice, i.e. no visits to either pot (NC and Prop-NC respectively). The proportion of bed bugs that visited the odour pot first was calculated as a proportion (Prop-O pot).

Table 8: Electrophysiological data showing number of responses to EAG active compounds.

Table 9 is a summary of data comparing different refined synthetic blends.

The invention will now be described by way of the following non-limiting examples.

Example 1: Coupled Gas Chromatography-Electroantennography (GC-EAG) of Volatile Extracts from Bed Bug Exposed Papers Methodology
Preparation of Bed Bug-Exposed Papers Bed bug-exposed papers used for volatile isolation were filter papers that had previously been exposed to bed bugs, as follows. One hundred bed bugs of mixed sex and stage were put into plastic colony pots containing filter papers (accordion folded, 70×40 mm). Bed bugs used the paper as a refuge; aggregating, defecating and ovipositing in the folds. After one month, the bed bugs, eggs and exuviae were removed from the paper. Gloves were worn whilst handling the bed bug-exposed paper.

Air Entrainment

Ten bed bug-exposed filter papers were contained in a glass vessel (250 mL). Ten unexposed filter papers (70×40 mm) were placed in a second vessel as a filter paper control Air was pulled through a charcoal filter (activated charcoal, 10-14 mesh, 50 g) for purification, into the glass chambers and across the filter paper at a flow rate of 600 mL min$^{-1}$. As a blank control, an entrainment was also completed of an empty glass vessel. Air from each vessel was then pulled out into a pyrex tube containing Porapak Q (50 mg, mesh size 50/80), a porous polymer that traps volatile compounds, held in place by two plugs of silanised glass wool. Entrainment vessels were purged for 10 min prior to insertion of the Porapak tubes and then the entrainment was run for 7 days (see FIG. 1). When the Porapak tubes were removed, they were eluted with 750 μL of freshly re-distilled diethyl ether into 1.1 mL vials. The vials were stored at −20° C. prior to analysis. The experiment was replicated 8 times. An aliquot (30 μL) of each of the 8 volatile extracts (50 μL) were combined to give a more concentrated extract for further analysis. The remaining 20 μL of each volatile extract was sealed separately into small glass ampoules and stored at −20° C. Charcoal filters were cleaned before entrainment by attachment to a flow of purified nitrogen whilst being heated in an oven (150° C.) for two hours. Porapak tubes were cleaned by washing with dichloromethane (1 mL) followed by re-distilled diethyl ether (4 mL) and conditioned by attachment to a flow of purified nitrogen whilst in heating blocks (135° C.) for two hours. The Porapak cleaning process was done twice to ensure complete removal of all volatile compounds. All glassware was washed in warm water with detergent (1% Teepol), then acetone and placed in an oven (150° C.) for two hours before being used.

Insect Preparation

Experimental insects, unless otherwise stated, were mated males and females of *C. lectularius* that had been fed 7 to 14 days previously on heparinised sheep blood. The electrodes used to make recordings were Ag/AgCl wires (diameter 0.37 mm) inserted into glass pipettes, made from borosilicate glass capillaries (outer diameter 2.0 mm; inner diameter 1.16 mm). The glass pipettes were filled with Ringers solution (7.55 g NaCl, 0.64 g KCl, 0.22 g CaCl$_2$, 1.73 g MgCl$_2$ g, 0.86 g NaHCO$_3$ and 0.61 g Na$_3$PO$_4$ L$^{-1}$ water). The bed bug was then chilled on ice for one minute before dissection. Preparations were held in a continuous, humidified, charcoal filtered air flow (1 L$^{-1}$) coming from a glass tube, which was positioned 5 mm from the antennal preparation. Once the antennal preparation and EAG equipment were in position the microscope light was switched off.

Coupled Gas Chromatography-Electroantennography (GC-EAG)

The GC used was a HP-680N, containing a HP-1 column (30 m×0.32 mm; film thickness, 0.52 μm) with a COC injector, hydrogen carrier gas and a FID. The oven temperature was maintained at 40° C. for two min and then programmed at 5° C. min$^{-1}$ to 100° C. and then at 10° C. min$^{1}$ to 250° C. The end of the column was inserted into the centre of the main air flow so that the eluent went over the antennal preparation. A heated transfer line ensured that the compounds did not cool and condense inside the column once they left the GC oven. Amplification of the signals was set at ×10,000. Signals were analysed using the computer-based software package, EAD 2000 (Syntech®, The Netherlands). The volatile extract (1 μL) from an air entrainment of bed bug-exposed papers (see Example 1) was injected onto the column. A solution of n-alkanes (C$_7$-C$_{25}$, 1 μL of 100 ng μL$^{-1}$) in hexane was also analysed to calculate the retention indices (RI) of any EAG-active peaks for comparison with GC and coupled GC-MS traces (Equation 1).

$$\text{Retention Index}(RI) = 100\left[\frac{\log RtX - \log Rtn}{\log Rtn + 1 - \log Rtn}\right] + 100n \quad \text{Equation 1}$$

Equation for calculation of retention indices (RI) using n-alkanes.

Rt = Retention time,

X = Compound of interest, n = alkane before compound of interest and n + 1 = alkane after compound of interest.

Data Analysis

Electroantennographic (EAG) responses from the coupled gas chromatography-electroantennographic (GC-EAG) analysis of the volatile extract collected using air entrainment were determined by visual appearance. Coupled GC-EAG traces were examined visually on a light box to identify EAG responses and match them to peaks on the GC traces. A combination of characteristics including the amplitude and shape of the deflection from the baseline were used to identify EAG responses. For example, an EAG response is usually of greater amplitude than the background noise and it has a characteristic negative deflection followed by a quick positive deflection resulting in a short sharp response often of similar shape and position as the corresponding peak on the GC trace. Responses were matched between males and females separately onto master traces for each sex. The EAG-active peaks were labelled from 1 to 21. Male and female master traces were then overlaid to identify where consistent responses occurred in both sexes. Five or more individuals responding at the same retention time on the GC trace was considered to be a consistent EAG response and the corresponding peak on the GC trace was considered to be EAG-active. Three thresholds were used: greater than 5, greater than 10 or greater than 15 individuals responding to the same GC peak or at the same retention time. The traces were then subjected to manual or automated statistical analysis.

Results

When the volatile extract from bed bug-exposed paper was analysed by coupled GC-EAG, 21 EAG-active peaks were recorded (peaks 1-21; Table 2 and FIG. 2). Both males and females of *C. lectularius* responded to all 21 of the EAG-active peaks.

TABLE 2

Coupled gas chromatography-electroantennography (GC-EAG) responses of bed bugs to a volatile extract from bed bug-exposed paper. For each EAG-active peak the retention time (RT), retention index (RI) and the number of responses in males and females and the total responses is given.

| EAG-active peak | RT | RI | Responses | | |
|---|---|---|---|---|---|
| | | | Males | Females | Total |
| 1 | 5.84 | n/a | 5 | 4 | 9 |
| 2 | 7.38 | 880 | 6 | 7 | 13 |
| 3 | 8.12 | 933 | 5 | 3 | 8 |
| 4 | 8.56 | 965 | 4 | 7 | 11 |
| 5 | 8.81 | 983 | 9 | 10 | 19 |
| 6 | 9.06 | 1000 | 4 | 7 | 11 |
| 7 | 9.34 | 1023 | 5 | 6 | 11 |
| 8 | 9.50 | 1036 | 8 | 8 | 16 |
| 9 | 9.90 | 1068 | 8 | 5 | 13 |
| 10 | 10.03 | 1078 | 8 | 9 | 17 |
| 11 | 10.12 | 1085 | 8 | 9 | 17 |
| 12 | 10.36 | 1104 | 7 | 10 | 17 |
| 13 | 10.77 | 1140 | 5 | 8 | 13 |
| 14 | 11.15 | 1173 | 5 | 4 | 9 |
| 15 | 11.32 | 1187 | 7 | 5 | 12 |
| 16 | 11.53 | 1205 | 8 | 8 | 16 |
| 17 | 12.08 | 1256 | 6 | 6 | 12 |
| 18 | 12.88 | 1331 | 7 | 5 | 12 |
| 19 | 12.94 | 1337 | 4 | 5 | 9 |
| 20 | 14.35 | 1479 | 7 | 7 | 14 |
| 21 | 16.52 | 1723 | 4 | 3 | 7 |

Example 2: Identification and Quantification of EAG-Active Compounds

Methodology

Coupled Gas Chromatography-Mass Spectrometry (GC-MS)

Volatile extracts (1 μL) from the bed bug-exposed paper and two control air entrainments were analysed by coupled GC-MS, using an Autospec Ultima magnetic sector MS, coupled to an Agilent 6980 GC equipped with a DB-1 capillary column (50 m×0.32 mm; film thickness, 0.52 μm) and fitted with a COC injector. The carrier gas was helium. The oven temperature was maintained at 30° C. for 5 min, and then programmed at 5° C. min[-1] to 250° C. Ionization was by electron impact at 70 eV, source temperature 200° C.

Peak Enhancement

The majority of the identified compounds were commercially available. Compounds that were not available commercially, i.e. (S)-(−)-germacrene D and (3E, 5E)-octadien-2-one, were provided via liquid chromatography/chemical synthesis at Rothamsted Research by Dr. Mike Birkett. (R)-(+)-Germacrene D (11% by GC) was purified from "gum haggar", a gum resin from *Commiphora holtziana* (Engl., 1904) (Birkett et al., 2008), whilst (S)-(−)-germacrene D (92% pure) was purified from a commercially available sample (RC Treatt, UK, 40% pure) by small-scale liquid chromatography over silica impregnated with silver nitrate. The two enantiomers of germacrene D were then combined in solution in equal amounts for co-injection. 3,5-Octadien-2-one (40 mg, 83% pure by GC) was synthesized in one step starting from (E)-2-pentenal (Sigma-Aldrich, Dorset, UK, 95% pure) (Clemo & Pattenden, 1985). A sample of (p)-mentha-1,3,8-triene was obtained in the form of an essential oil of parsley, *Petroselinum sativum* (Hoffman, 1814; 100% pure essential oil; Oshadhi Ltd, Cambridge, UK). Each authentic standard was then injected onto the GC and the retention times were compared to that of the EAG-active peaks in the extract. Standards were analysed using a Hewlett Packard (HP-6890) GC with a non-polar methylsiloxane (HP-1) and a polar (DB-WAX) column. HP-1 (50 m×0.32 mm; film thickness, 0.52 μm) and DB-WAX (30 m×0.32 mm; film thickness, 0.5 μm) columns were fitted with; a cool-on-column (COC) injector, hydrogen carrier gas and a flame ionisation detector (FID). The oven temperature was maintained at 30° C. for 0.5 min and then programmed at 5° C. min[-1] to 150° C., held for 0.1 min, then 10° C. min[-1] to 230° C. and then held for 35 min. If the retention times matched or were within one minute in either direction, co-injection of the volatile extract with standard chemicals was performed with the aim to double the peak area without increasing the peak width. A chiral 3-cyclodextrin column (30 m×0.25 mm; film thickness, 0.25 μm) with a COC injector, hydrogen carrier gas and a FID, was used for separation of enantiomers when necessary. The oven temperature was maintained at 30° C. for 0.5 min and then programmed at 5° C. min[-1] to 150° C., held for 0.1 min, then 10° C. min[-1] to 230° C. and then held for 35 min.

Quantification of EAG-Active Compounds

A multiple point external standard method was used for quantification of the EAG-active compounds identified from the air entrainment extract of the bed bug-exposed paper. The peak area of three injections (1 μL) at four standard concentrations (i.e. 100, 50, 10 and 1 ng μL$^{-1}$) of the authentic chemical standards was calculated and used to plot calibration curves. The mean peak area of the EAG-active chemicals in the volatile extract from bed bug-exposed papers was then calculated from three injections (1 μL). All analysis was completed on a HP-1 column using the method described previously but with an auto-sampler to reduce error introduced by manual injection. Chemicals that did not resolve well on a HP-1 column, e.g. nonanoic acid, were quantified on a DB-WAX column. Due to overlap in retention times the chemicals were separated into groups for quantification. Where chemicals standards were of unknown dose (i.e. (S)-(−)-germacrene D and (3E, 5E)-octadien-2-one), a multiple point external standard quantification was completed with a chemical of a similar type. For example, as (S)-(−)-germacrene D was purified for the present study and the concentration of the solution was unknown, a sample of (E)-caryophyllene (SAFC, Poole, UK, ≥80% purity) was quantified using multiple point external standards. The equation from the calibration curve was then used to calculate the concentration of the (S)-(−)-germacrene D solution. To determine the concentration of the (3E, 5E)-octadien-2-one solution, a standard of 2-octanone (Sigma-Aldrich, ≥99% purity) was quantified.

NMR Spectroscopy

The $^1$H NMR and $^{13}$C NMR spectra were acquired on a Bruker spectrometer operating at 500 MHz for $^1$H and 125 MHz for $^{13}$C, equipped with a 5 mm broad band probe (BBO), using $CD_3OD$ as solvent (5.4 mg of sample was dissolved in 0.5 ml of solvent and transferred into a 5 mm NMR tube). The $^1$H and $^{13}$C NMR spectra were collected, respectively with free induction decays (FID). The two-dimensional (2D) experiments were acquired and processed with software provided by Bruker. Standard pulse sequences were used for 1H-1H COSY 90°. Two dimensional inverse hydrogen detected heteronuclear shift correlation HSQC spectra were obtained with software provided by Bruker (TopSpin). Two-dimensional inverse hydrogen detected heteronuclear long range correlation $^1$H-$^{13}$C HMBC experiments were carried out using also the software provided by Bruker.

Results

TABLE 3

Composition of volatile extract collected by air entrainment

| EAG-active peak | Chemical name | Amount ng/ul | Relative amount |
|---|---|---|---|
| 1 | Hexanal | 14.61 | 21.77 |
| 2 | Heptanal | 4.92 | 7.33 |
| 3 | Benzaldehyde | 4.84 | 7.21 |
| 4 | (RS)-1-Octen-3-ol | 25.95 | 38.67 |
| 5 | Octanal | 73.42 | 109.40 |
| 6 | 3-Carene | 28.03 | 41.76 |
| 7 | β-Phellandrene | 28.98 | 43.18 |
| 8 | (E)-2-octenal | 102.23 | 152.32 |
| 9 | (3E,5E)-Octadien-2-one | 43.35 | 64.59 |
| 10 | Unknown 1 | n/a | n/a |
| 11 | Nonanal | 266.15 | 396.56 |
| 12 | Unknown 2 | n/a | n/a |
| 13 | (E)-2-Nonenal | 67.68 | 100.84 |
| 14 | 2-Decanone | 19.47 | 29.01 |
| 15 | Decanal | 60.63 | 90.34 |
| 16 | Dodecane | 36.17 | 53.89 |
| 17 | Nonanoic acid | 33.07 | 49.27 |
| 18 | 2-(2-Butoxyethoxy) acetate ethanol | 63.26 | 94.26 |
| 19 | (E)-2-Undecenal | 16.74 | 24.94 |
| 20 | (S)-(−)-Germacrene D | 0.67 | 1.00 |
| 21 | Unknown 3 | n/a | n/a |

Example 3: Behavioural Analysis of Bed Bug-Exposed Paper and Volatile Extracts Attraction of male, female and juvenile bed bugs to the bed bug-exposed paper and isolated material was demonstrated in a still air olfactometer designed specifically for testing the response of bed bugs to semiochemicals.

Methodology

Insects

Twelve hours before use, experimental insects (*C. lectularius*) were transferred into a pot for transporting to the bioassay room the following day. The bioassay room was maintained at the same temperature and light cycle as the rearing room. The RH in the room was maintained at 50%±t 5%. Relative humidity in domestic properties is typically less than 50% so this RH should not stress the test insects. However, as a precaution, bed bugs were introduced to the room 60 min prior to use, to give them time to acclimatise to the change in RH and any other differences in environmental conditions.

Olfactometer

Figure 3:
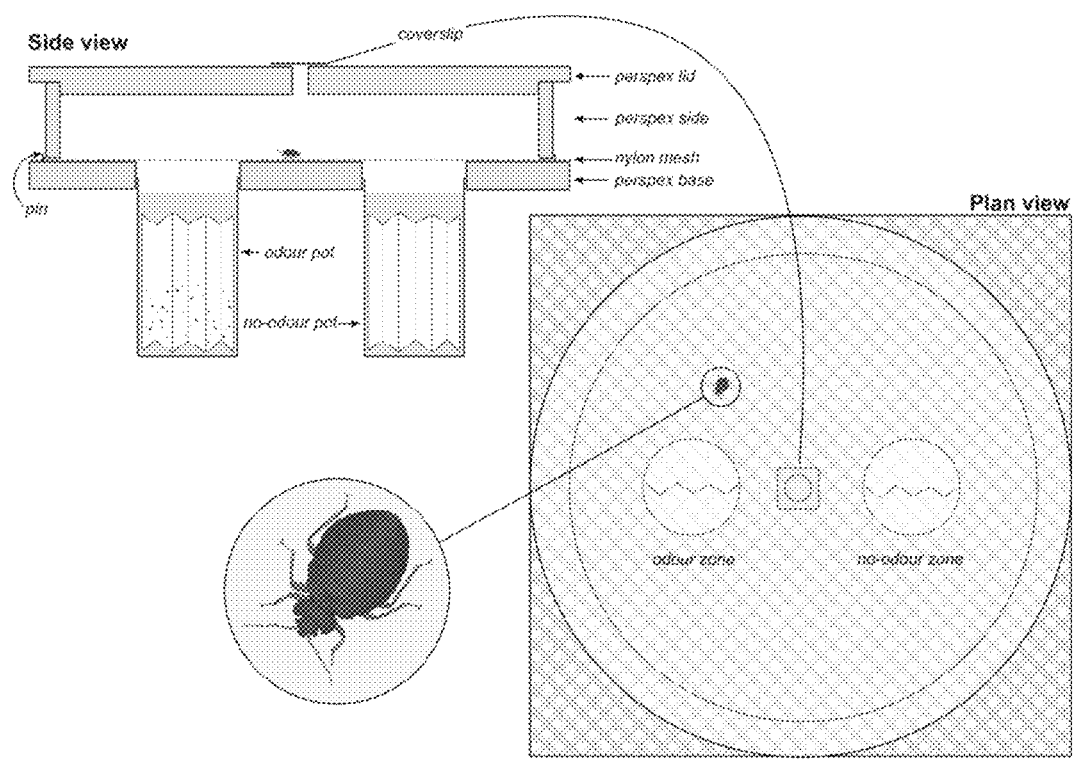

The olfactometer design consisted of a circular arena (diameter 190 mm) comprising a Perspex base (220×220 mm), wall (height 24 mm) and lid (FIG. 3). The arena, which was lined with fine mesh (pore size 500 μm), had two holes (diameter 26 mm) under which plastic pots (60×40 mm) were placed. The lid and the base were graduated such that they created a tight seal with the wall and the pots, respectively. The mesh was held in place on the base with pins, the wall was positioned inside these pins and the lid slotted on top of the wall. A central circular hole (diameter 10 mm) enabled the introduction of bed bugs to the arena without removal of the lid. This hole was covered during experiments with a glass cover slip (22×22 mm) to prevent bed bugs from escaping. After use, olfactometers were washed with warm water and detergent (1% Teepol® 12-20 unperfumed detergent), rinsed with 50% ethanol followed by water and dried between replicates. New pots, mesh and unexposed filter papers were used for each replicate. Before use, pots and mesh were washed with warm water and detergent (1% Teepol®), rinsed with 50% ethanol (50% distilled water), followed by water and dried. Clean cotton gloves were worn when handling olfactometers and other equipment.

Video Equipment

For all behavioural experiments, where data were recorded using EthoVision®, a high resolution monochrome camera with a varifocal lens (5-50 mm, manual iris) and an IR pass filter was used. The camera was suspended above the olfactometer using a stand. Light for the recordings was provided by two IR light emitting diode (LED) arrays, positioned to provide indirect lighting to reduce reflections. The whole set-up was contained in a white screen (45×45× 100 cm) and the base of the stand was covered with white paper to reflect light.

EthoVision® Software

An individual bed bug was introduced into the centre of the arena using a fine paint brush and then tracked for 20 min. EthoVision® Version 3.1 software (Noldus Information Technology) was used to capture video images to track bed bugs during bioassays. The detection method used for acquisition was subtraction, as described below. The detection thresholds were set so that all objects which were different to the background image by less than 9 or greater than 255 pixels were ignored and, therefore, recognised as part of the background. To reduce problems caused by background noise, a scan window was used (100 pixels), which was set to search the complete arena after five missed samples. The sampling rate was five samples/s. For each sample the software detects the bed bug as a difference from the background image and records its position. The arena was divided into zones by two different zone definitions (see FIG. 4). A standard calibration of the arena was completed to enable EthoVision® to convert distances between two points from pixels to x, y coordinates.

Preparation of the Odour and No-Odour Pots

Pots were prepared and treated as follows, and then positioned randomly below the left or right hole of the olfactometer.

Positive control (bed bug-exposed papers): The bed bug-exposed material was filter paper (70×40 mm) prepared as described in Example 1 and then placed in a new pot. The corresponding no-odour pot contained an unexposed filter paper of the same size. The position of the odour and no-odour pots was randomised between replicates. For the positive control, the equipment was set up 20 min before the start of the bioassay.

Volatile extracts: The volatile extract was removed from the freezer one hour prior to the first bioassay and were maintained at room temperature throughout the day. The volatile extract (10 μL) was applied onto the unexposed filter paper in the designated odour pot (randomised) and the corresponding no-odour pot was treated with solvent, re-distilled diethyl ether (10 μL). The re-distilled diethyl ether, which was freshly distilled for each block, was maintained at room temperature. The pots were then left for 30 s to allow the solvent to evaporate, before the olfactometer was assembled.

Experiment 1: Bed Bug-Exposed Papers

The still-air olfactometer was used to investigate the variation in response to volatiles from bed bug-exposed paper between males, females and nymphs. The females were further separated into mated and virgin individuals to investigate the effect of mating status. Virgin females were obtained by isolating engorged fifth instar nymphs into vials for moulting into adults. After moulting, females were kept separately from males. The nymphal instar tested was of the 5$^{th}$ stage. Treatment (i.e. presence or absence of the volatiles), sex/stage and odour pot position were considered as factors and randomised. In each block (comprising one day), each bed bug sex/stage type was tested in the presence and absence of the volatiles from bed bug-exposed paper. Each block (see below) was tested on a different bed bug-exposed paper (n=13). Variables were: visits to pots and time spent per zone. The bioassays were completed in the early scotophase, between 10:00 and 14:00 h.

(i) filter paper treated with redistilled diethyl ether (Control) with males;
(ii) Bed bug exposed papers (BBEXP) with males;
(iii) filter paper treated with redistilled diethyl ether (Control) with mated females;
(iv) Bed bug exposed papers (BBEXP) with mated females;
(v) filter paper treated with redistilled diethyl ether (Control) with virgin females;
(vi) Bed bug exposed papers (BBEXP) with virgin females;
(vii) filter paper treated with redistilled diethyl ether (Control) with nymphs; and
(viii) Bed bug exposed papers (BBEXP) with nymphs;

Experiment 2: Volatile Extracts

The response of bed bugs to different doses of the volatile extract from bed bug-exposed papers was examined by behavioural bioassay. Treatment (i.e. negative control (solvent), positive control (bed bug-exposed paper) and volatile extract dose 1 or 0.02%, 2 or 0.2% and 3 or 2%), sex and odour pot position were considered as factors and randomised. In each block (comprising one day) males and females of C. lectularius were tested with each of the five treatments. Therefore, one block (see below) comprised 10 bioassays (n=20). Variables were: number of visits to pots and time spent in zones. The bioassays were completed in the early scotophase, between 10:00 and 15:00.

(ix) filter paper treated with redistilled diethyl ether (Control) with males;
(x) Bed bug exposed papers (BBEXP) with males;
(xi) Volatile extracts from Bed bug exposed papers, 0.02% solution (EXT 1) with males,
(xii) Volatile extracts from Bed bug exposed papers, 0.2% solution (EXT 2) with males;
(xiii) Volatile extracts from Bed bug exposed papers, 2% solution (EXT 3) with males;
(xiv) filter paper treated with redistilled diethyl ether (Control) with females;
(xv) Bed bug exposed papers (BBEXP) with females;
(xvi) Volatile extracts from Bed bug exposed papers, 0.02% solution (EXT 1) with females,
(xvii) Volatile extracts from Bed bug exposed papers, 0.2% solution (EXT 2) with females; and
(xviii) Volatile extracts from Bed bug exposed papers, 2% solution (EXT 3) with females.

Statistical Analyses

EthoVision® tracks, where the bed bug failed to move any distance greater than from the centre of the arena to the edge (non-responders) or when the equipment failed and the bed bug was inaccurately tracked (failure of software), were noted but not excluded from the analysis.

The x, y coordinates were analysed in EthoVision® to calculate orientation and activity variables. The difference was calculated between the odour and no-odour data (O-NO). Therefore, a positive difference indicated a greater mean for the odour than the no-odour zone or pot. The difference in the time spent in each zone (s) and the difference in the number of visits to each pot was calculated. The LSDs at the 5% level were used to determine significance within the treatment factors. Treatment means were compared to their corresponding negative control. Additionally, the response to volatiles and first visit to a pot (odour or no-odour) were calculated. Insects were defined as either making a choice (making the first visit to either pot) or making no choice, i.e. an insect that visited neither pot throughout the duration of the bioassay.

Residual plots for each variable indicated that the data were normally distributed, therefore, a restricted maximum likelihood (REML) analysis was used. The null hypotheses were that there was no significant difference in bed bug behaviour dependent on the presentation of bed bug volatiles. All results were analysed using GenStat version 11.0.

Results

Experiment 1: Bed Bug-Exposed Paper

Figure 5A:
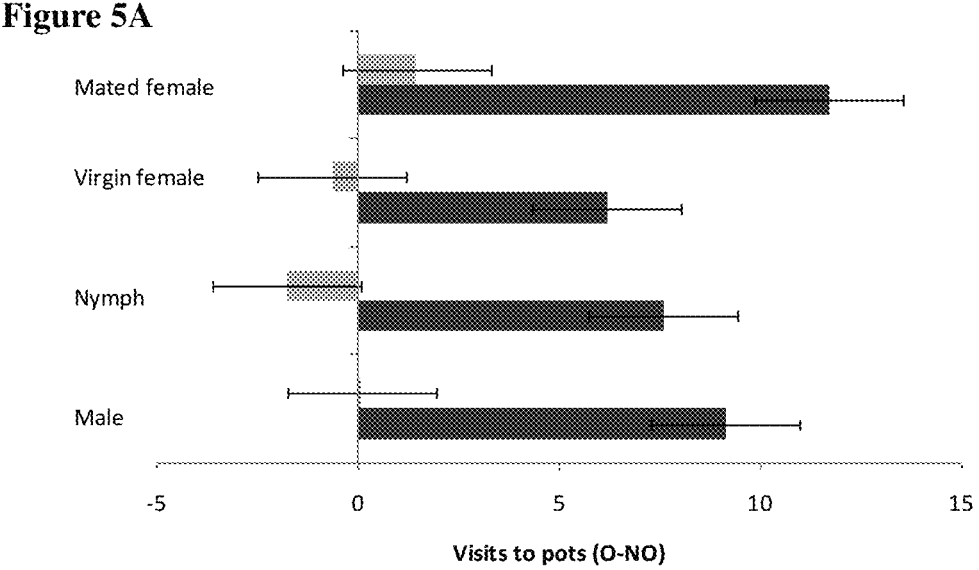
Figure 5B:
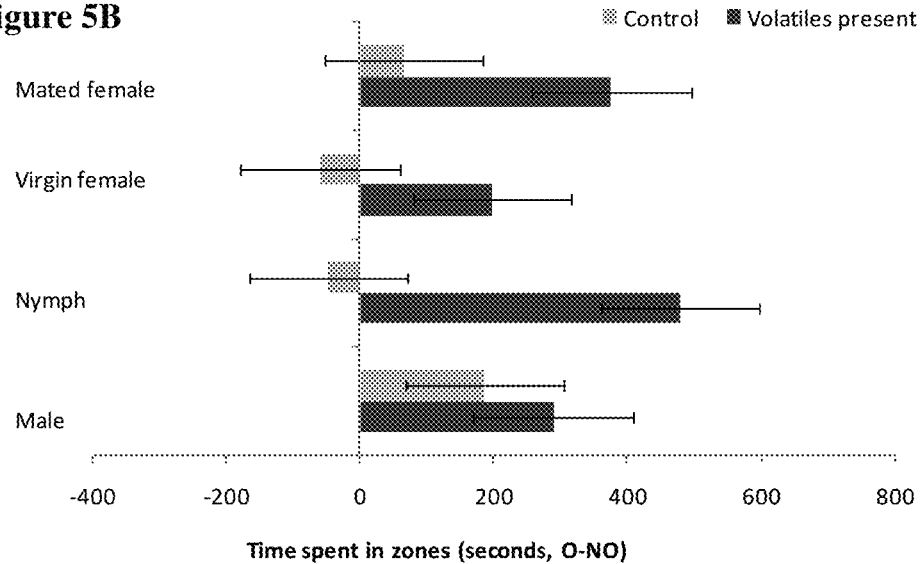

Bed bugs responded to the volatiles from bed bug-exposed papers and there were significantly more visits to the odour pot (FIG. 5; $F_{1,83}$=33.66, P<0.001) and significantly more time spent in the odour zone ($F_{1,95}$=12.65, P<0.001) in the presence of the volatiles from bed bug-exposed paper when compared with controls. The effect of sex and stage of the insect was not significant when considered alone or as an interaction with the treatment for either variable.

Experiment 2: Volatile Extracts

TABLE 4

First choice of Cimex lectularius in Still-air olfactometer II in response to the volatile extract. Volatile extract (EXT) tested at three doses, 1, 2 and 3 (0.02, 0.2 and 2%). The number of individuals visiting the odour pot (O pot) and the no-odour pot (NO pot) first is given along with the number and proportion of bed bugs that made no choice, i.e. no visits to either pot (NC and Prop-NC respectively). The proportion of bed bugs that visited the odour pot first was calculated as a proportion (Prop-O pot).

| Treatment | O pot | NO pot | Choice | NC | Total | Prop-O pot | Prop-NC |
| --- | --- | --- | --- | --- | --- | --- | --- |
| Control | 16 | 19 | 35 | 5 | 40 | 0.46 | 0.13 |
| BBEXP | 19 | 21 | 40 | 0 | 40 | 0.48 | 0.00 |
| EXT1 | 16 | 22 | 38 | 2 | 40 | 0.42 | 0.05 |
| EXT2 | 21 | 18 | 39 | 1 | 40 | 0.54 | 0.03 |
| EXT3 | 20 | 15 | 35 | 5 | 40 | 0.57 | 0.13 |

Figure 6A:
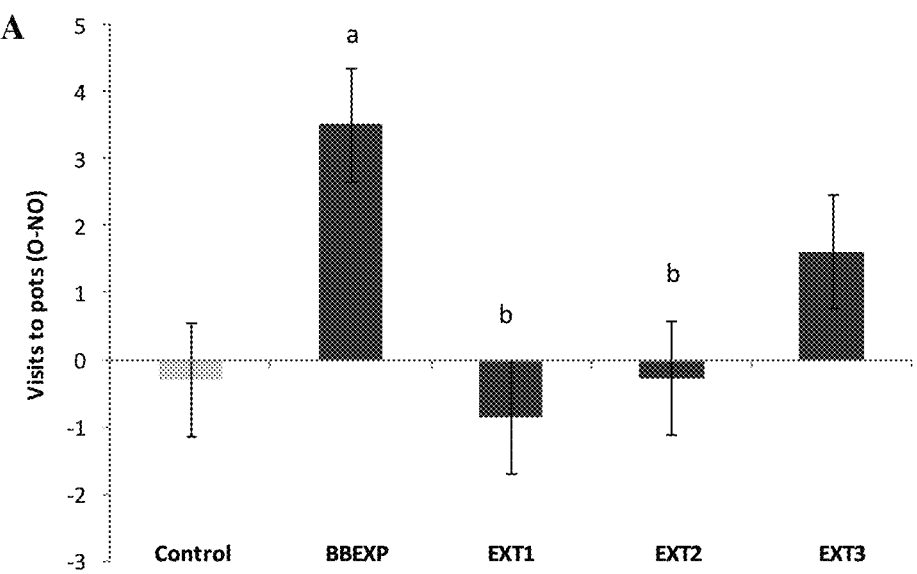
Figure 6B:
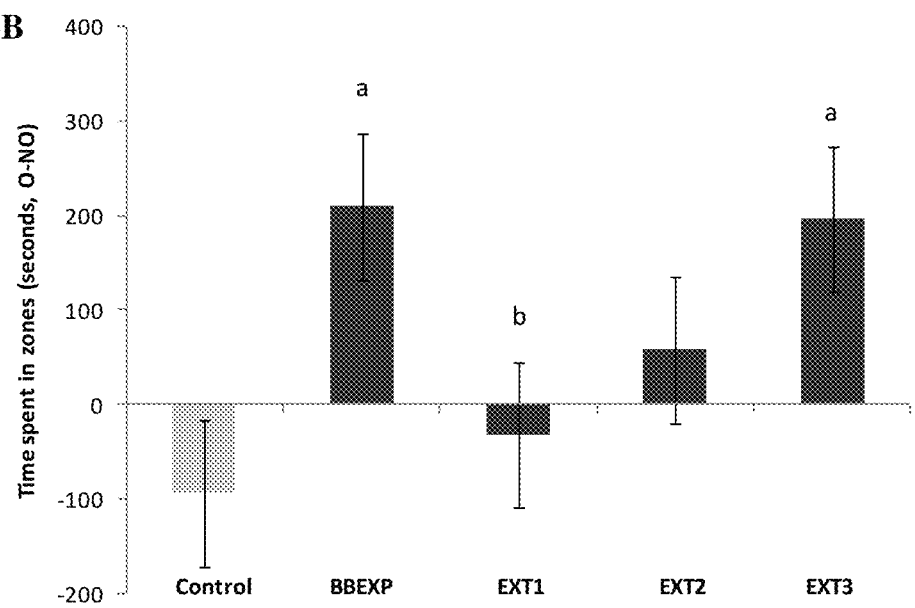

The response of bed bugs was dependent upon the treatment (FIG. 6). There were significantly more visits to the odour pot ($F_{1,174}$=4.73, P=0.001) and significantly more time spent in the odour zone ($F_{1,174}$=3.21, P=0.014) in the presence of the bed bug-exposed paper (positive control) when compared with the negative control. With regards to the response of bed bugs to different doses of the volatile extract, only the highest dose (dose 3 or 2%) was significantly different from the negative control for either variable. In the presence of the volatile extract, at a dose of 2%, bed bugs spent significantly more time in the odour zone than during controls. The number of visits to odour pots in the presence of a 2% dose of volatile extract was not significantly different from during controls. However, there was a trend for an increased number of visits, which was not significantly different to the number of visits to the odour pot during the positive control (bed bug-exposed paper). The number of visits to the odour pot at both of the lower doses of the volatile extract was significantly less than during the positive control. However, only in the presence of the lowest dose (dose 1 or 0.02%) did bed bugs spend significantly less time in the odour zone than during the positive control. The interaction between treatment and sex was not significant for either variable.

The proportion of bed bugs that failed to make a choice was low for all treatments (≤ 13%). When investigating the first choice of bed bugs, there was little difference between the treatments. For example, only 48% of bed bugs chose to visit the odour pot first in the presence of the volatiles from bed bug-exposed paper, compared to 46% during the negative control. Interestingly, there was an increased number of first visit to the odour pot with an increase in concentration of volatile extract: from 42% at the 0.02% level, to 57% at 2% (Table 4).

Example 4: Behavioural Analysis of Synthetic Blends SB-16 and SB-18

Preparation of Synthetic Blends

Two exemplary synthetic blends ("SB-16" and "SB-18") containing EAG-active compounds were prepared as described in Table 5. Gas chromatography on HP-1 and DB-WAX columns was used to check that the ratios of the chemicals in the synthetic blends were accurate before they were diluted to the dose needed for experimentation. The synthetic blends were diluted in freshly re-distilled diethyl ether and stored in 1.1 mL pointed vials at −20° C. prior to use in bioassays.

For the dose response, the 100% solutions of volatile extracts were diluted to, 2, 4 and 8% (dose 3, 4 and 5).

Experiment 1 (SB-16)

Methodology

The methodology used was the same as that described in Example 3, with the exception of the following alterations:

Volatile Extracts and Synthetic Blends

The volatile extract and synthetic blend were removed from the freezer one hour prior to the first bioassay and were maintained at room temperature throughout the day. The volatile extract or synthetic blend (10 µL) was applied onto the unexposed filter paper in the designated odour pot (randomised). The volatile extract from bed bug-exposed paper and the synthetic blends of EAG-active compounds were all diluted in re-distilled diethyl ether. In order to enable the comparison of bed bug behaviour in the presence and absence of the volatile extract and synthetic blends, both the odour pot and the no-odour pot in the negative control consisted of unexposed filter papers treated with re-distilled diethyl ether (10 µL). The re-distilled diethyl ether, which was freshly distilled for each block, was maintained at room temperature. When testing the response of bed bugs to solvent, the pots were left for 30 s to allow the solvent to evaporate, before the olfactometer was assembled.

Experimental Protocol

The response of bed bugs to different doses of SB-16 was examined by behavioural bioassay. The factors were treatment (i.e. negative control (solvent), positive control (bed bug-exposed paper), three doses of the volatile extract (dose 3, 4 and 5) and the same three doses of SB-16) and odour pot position, which were randomised within each block. In each block (comprising one day) males of *C. lectularius* were tested with each of the eight treatments (see below). Therefore, one block comprised 8 bioassays (n=20). Variables were: number of visits to pots and time spent in zones. The bioassays were completed in the early scotophase, between 10:00 and 15:00.

(i) filter paper treated with redistilled diethyl ether (Control);

TABLE 5

Composition of synthetic blends SB-16 and SB-18

| EAG-active Peak | Chemical | Dilutions of volatile extracts (ng µl⁻¹) | | | | Synthetic blend | |
|---|---|---|---|---|---|---|---|
| | | 2% | 4% | 8% | 100% | SB-16 | SB-18 |
| 1 | Hexanal | 0.29 | 0.58 | 1.17 | 14.61 | • | • |
| 2 | Heptanal | 0.10 | 0.20 | 0.39 | 4.92 | • | • |
| 3 | Benzaldehyde | 0.10 | 0.19 | 0.39 | 4.84 | • | • |
| 4 | (RS)-1-Octen-3-ol | 0.52 | 1.04 | 2.08 | 25.95 | • | • |
| 5 | Octanal | 1.47 | 2.94 | 5.87 | 73.42 | • | • |
| 6 | 3-Carene | 0.56 | 1.12 | 2.24 | 28.03 | • | • |
| 7 | β-Phellandrene | 0.58 | 1.16 | 2.32 | 28.98 | • | • |
| 8 | (E)-2-octenal | 2.04 | 4.09 | 8.18 | 102.23 | • | • |
| 9 | (3E,5E)-Octadien-2-one | 0.87 | 1.73 | 3.47 | 43.35 | | • |
| 11 | Nonanal | 5.32 | 10.65 | 21.29 | 266.15 | • | • |
| 13 | (E)-2-Nonenal | 1.35 | 2.71 | 5.41 | 67.68 | • | • |
| 14 | 2-Decanone | 0.39 | 0.78 | 1.56 | 19.47 | • | • |
| 15 | Decanal | 1.21 | 2.43 | 4.85 | 60.63 | • | • |
| 16 | Dodecane | 0.72 | 1.45 | 2.89 | 36.17 | • | • |
| 17 | Nonanoic acid | 0.66 | 1.32 | 2.65 | 33.07 | • | • |
| 18 | 2-(2-Butoxyethoxy)-ethyl acetate | 1.27 | 2.53 | 5.06 | 63.26 | • | • |
| 19 | (E)-2-Undecenal | 0.33 | 0.67 | 1.34 | 16.74 | • | • |
| 20 | (S)-(−)-Germacrene-D | 0.01 | 0.03 | 0.05 | 0.67 | | • |

(ii) Bed bug exposed papers (BBEXP);

(iii) Volatile extracts from Bed bug exposed papers, 2% solution (EXT 3), (iv) Volatile extracts from Bed bug exposed papers, 4% solution (EXT 4);

(v) Volatile extracts from Bed bug exposed papers, 8% solution (EXT 5);

(vi) SB-16, 2% solution (SB3);

(vii) SB-16, 4% solution (SB4); and (viii) SB-16, 8% solution (SB5).

Results

TABLE 6

First choice of *Cimex lectularius* in Still-air olfactometer II in response to a volatile extract and a 16-component synthetic blend. Volatile extracts (EXT) and synthetic blends (SB) at three doses, 3, 4 and 5 (2, 4 and 8% respectively). The number of individuals visiting the odour pot (O pot) and the no-odour pot (NO pot) first is given along with the number and proportion of bed bugs that made no choice, i.e. no visits to either pot (NC and Prop-NC respectively). The proportion of bed bugs that visited the odour pot first was calculated as a proportion (Prop-O pot).

| Treatment | O pot | NO pot | Choice | NC | Total | Prop-O pot | Prop-NC |
|---|---|---|---|---|---|---|---|
| Control | 11 | 9 | 20 | 0 | 20 | 0.55 | 0 |
| BBEXP | 17 | 2 | 19 | 1 | 20 | 0.89 | 0.05 |
| EXT3 | 10 | 5 | 15 | 5 | 20 | 0.67 | 0.25 |
| EXT4 | 10 | 6 | 16 | 4 | 20 | 0.63 | 0.20 |
| EXT5 | 12 | 4 | 16 | 4 | 20 | 0.75 | 0.20 |
| SB3 | 7 | 10 | 17 | 3 | 20 | 0.41 | 0.15 |
| SB4 | 7 | 9 | 16 | 4 | 20 | 0.44 | 0.20 |
| SB5 | 14 | 4 | 18 | 2 | 20 | 0.78 | 0.10 |

Figure 7A:
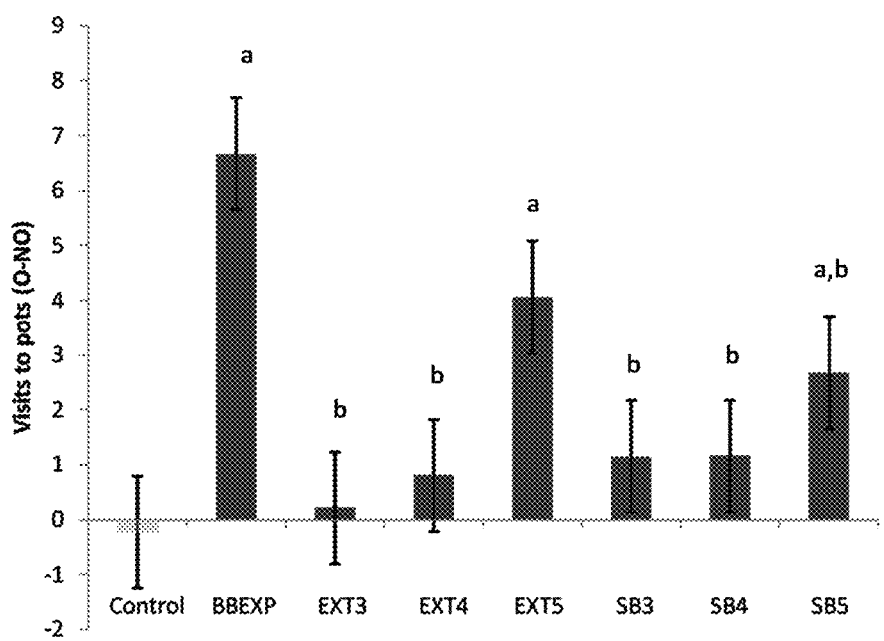
Figure 7B:
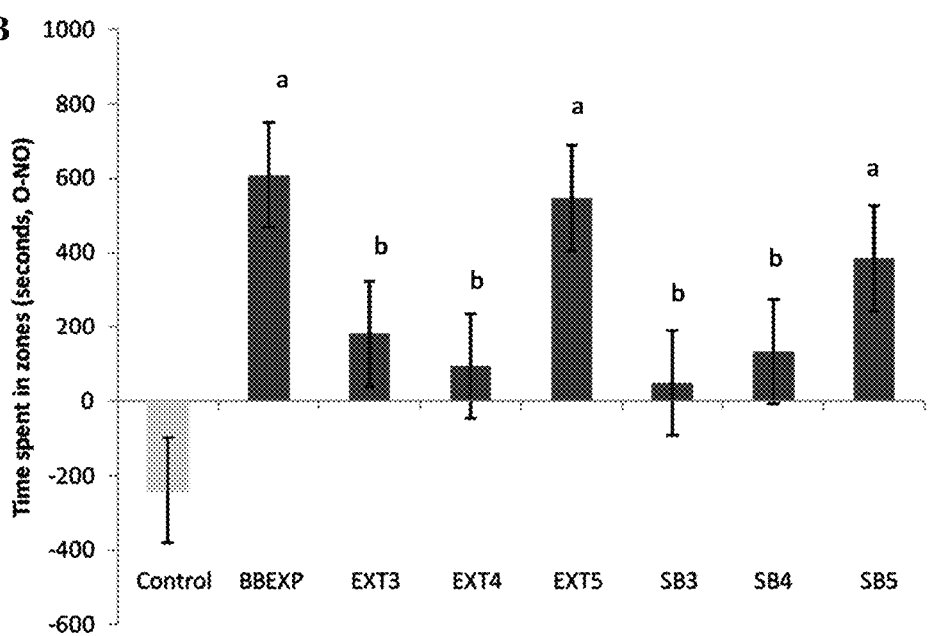

The response of bed bugs was dependent upon the treatment (see FIG. 7). There were significantly more visits to the odour pot ($F_{7,118.5}=5.28$, $P<0.001$) and significantly more time spent in the odour zone ($F_{7,138}=3.72$, $P=0.001$) in the presence of the bed bug-exposed paper ("BBEXP") when compared with the negative control ("Control"). With regards to the response of bed bugs to different doses, the highest dose (8% solution) of the volatile extract from bed bug-exposed paper (EXT5) and the 16-component synthetic blend of EAG-active chemicals (SB5) was significantly different from the negative control. In the presence of the volatile extract or synthetic blend at a dose of 8%, bed bugs spent significantly more time in the odour zone and made more visits to the odour pot than during negative controls.

The effect of the position of the odour pot did not have a significant effect on either time spent in zones ($F_{1,136}=0.01$, $P=0.915$) or visits to the pots ($F_{1,118.5}=0.62$, $P=0.434$).

There was a high proportion of responsive bed bugs in the presence of volatiles from bed bug-exposed paper (BBEXP, 95%, n=20). However, the number of bed bugs that failed to make a choice was low for all treatments (≤25%). More bed bugs visited the odour pot first in the presence of the volatiles from bed bug-exposed paper (BBEXP, 89%), in the presence of the volatile extract (75%) and in the presence of the synthetic blend (78%) at the highest dose (8% solution) than during controls (55%, Table 6).

Experiment 2: SB-18

Methodology

The methodology used was the same as that described in Experiment 1, above, except for the following alterations.

Synthetic Blend Treated Septa

Septa were treated with 30 µL of the synthetic blend found to produce the desired release rate. Additionally, a five times more dilute and a five times more concentrated solution was tested in a dose response, numbered 1 to 3 with decreasing concentration. After five hours in the wind tunnel, septa were removed, placed individually in vials and stored at −20'C. Septa were removed from the freezer two hours before use and stored at room temperature. Control septa were dosed with 30 µL of re-distilled diethyl ether and then the same protocol was followed as with septa treated with the synthetic blend. One treated septa was put into the odour pot and one control septa into the no-odour pot before the olfactometer was assembled immediately and the bioassay started.

Experiment Design

The response of bed bugs to different presentations of the volatiles from bed bug-exposed paper was examined by behavioural bioassay. Bed bug-exposed paper was compared to the volatile extract isolated by air entrainment and applied to filter paper and an 18-component synthetic blend of EAG-active compounds from the air entrainment applied to both filter paper and rubber septa. The volatile extract and the septa were tested at 8%. The septa were treated at the dose found to achieve the desired release rate (dose 2; equivalent to 8% volatile extract) and five times more dilute (dose 3) and five times more concentrated (dose 1). Controls consisted of filter paper and rubber septa treated with re-distilled diethyl ether. Treatment (i.e. negative control (solvent) septa, negative control (solvent) paper, positive control (bed bug-exposed paper), volatile extract paper, synthetic blend paper and synthetic blend septa dose 1, 2 and 3) and odour pot position were considered as factors and randomised. In each block (comprising one day) males of *C. lectularius* were tested with each of the eight treatments. Therefore, one block (see below) comprised 8 bioassays (n=20). Variables were: number of visits to pots and time spent in zones. The bioassays were completed in the early scotophase, between 10.00 and 15:00.

(i) filter paper treated with redistilled diethyl ether (Control paper);

(ii) Bed bug exposed papers (BBEXP);

(iii) Volatile extracts from Bed bug exposed papers, 8% solution, applied to filter paper (EXT 8%);

(iv) SB-18, 8% solution, applied to filter paper (SB 8%);

(v) SB-18, applied to rubber septa at a concentration equivalent to 8% release (Setpa_2);

(vi) SB-18, applied to rubber septa at a concentration 5 times that of Septa_2 (Setpa_1);

(vii) SB-18, applied to rubber septa at a concentration 5 times more dilute that of Septa_2 (Setpa_3);

(viii) Rubber septa treated with redistilled diethyl ether (Control septa).

Results

TABLE 7

First choice of *Cimex lectularius* in the Still-air olfactometer in response to different treatments, bed bug-exposed paper, volatile extract and synthetic blend applied to filter paper, and three doses of synthetic blend applied to rubber septa with their corresponding controls. The number of individuals visiting the odour pot (O pot) and the no-odour pot (NO pot) first is given along with the number and proportion of bed bugs that made no choice, i.e. no visits to either pot (NC and Prop-NC respectively). The proportion of bed bugs that visited the odour pot first was calculated as a proportion (Prop-O pot).

| Treatment | O pot | NO pot | Choice | NC | Total | Prop-O pot | Prop-NC |
|---|---|---|---|---|---|---|---|
| Control paper | 11 | 17 | 28 | 2 | 30 | 0.39 | 0.07 |
| Bed bug-exposed paper | 25 | 4 | 29 | 1 | 30 | 0.86 | 0.03 |
| Extract 8% | 15 | 10 | 25 | 5 | 30 | 0.60 | 0.17 |
| SB-18 8% | 12 | 10 | 22 | 8 | 30 | 0.55 | 0.27 |
| Septa_1 | 16 | 7 | 23 | 7 | 30 | 0.70 | 0.23 |
| Septa_2 | 15 | 7 | 22 | 8 | 30 | 0.68 | 0.27 |
| Septa_3 | 15 | 5 | 20 | 10 | 30 | 0.75 | 0.33 |
| Control septa | 9 | 6 | 15 | 15 | 30 | 0.60 | 0.50 |

Figure 8A:
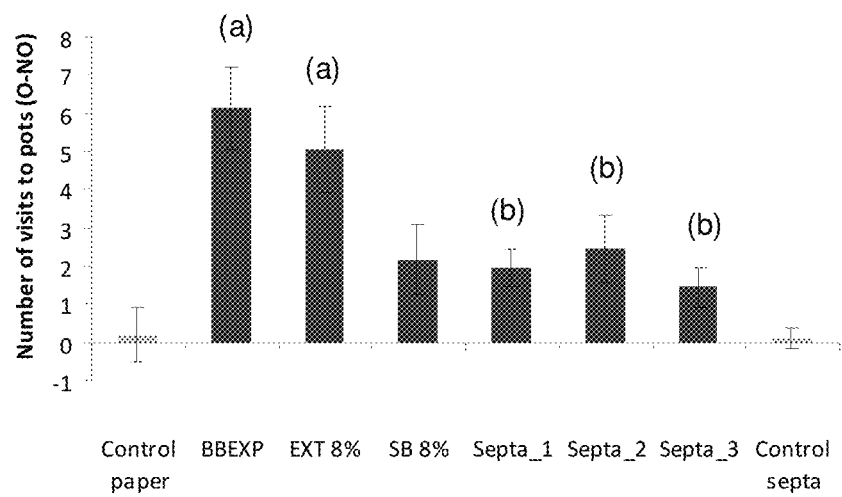
Figure 8B:
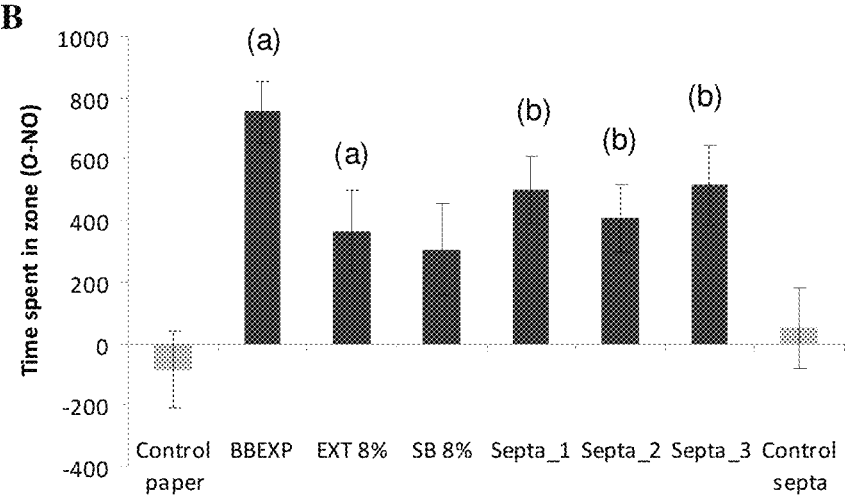
Figure 9:
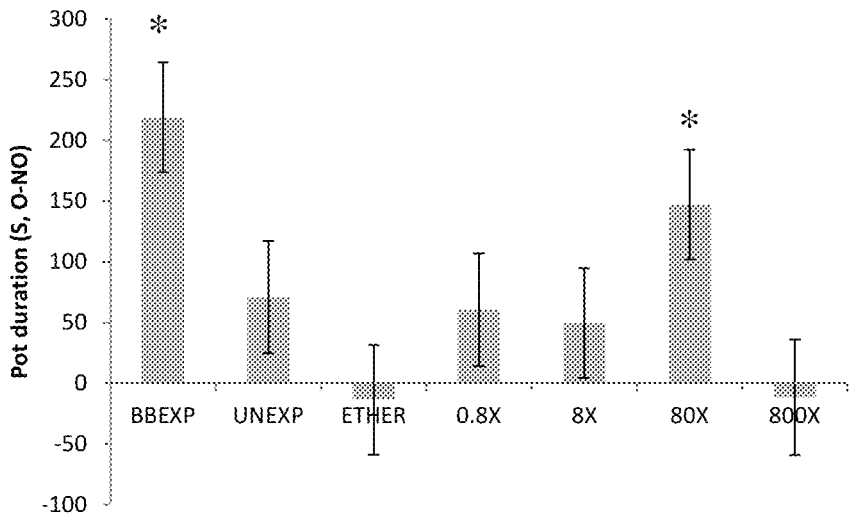
Figure 10:
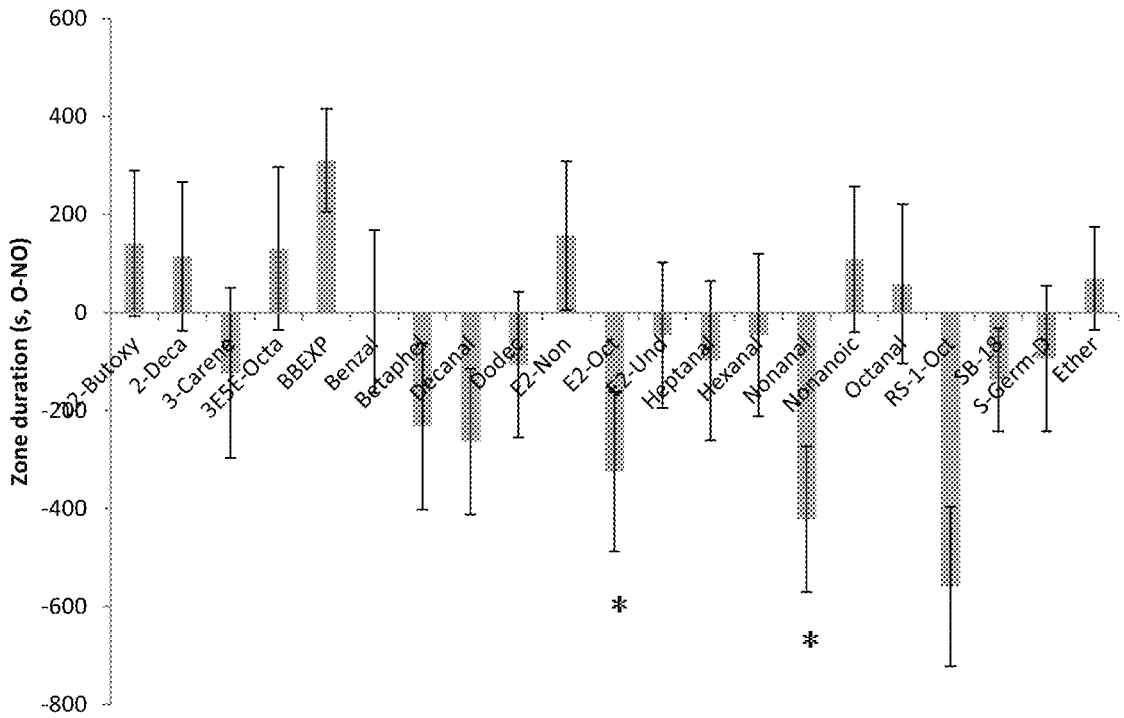
Figure 11:
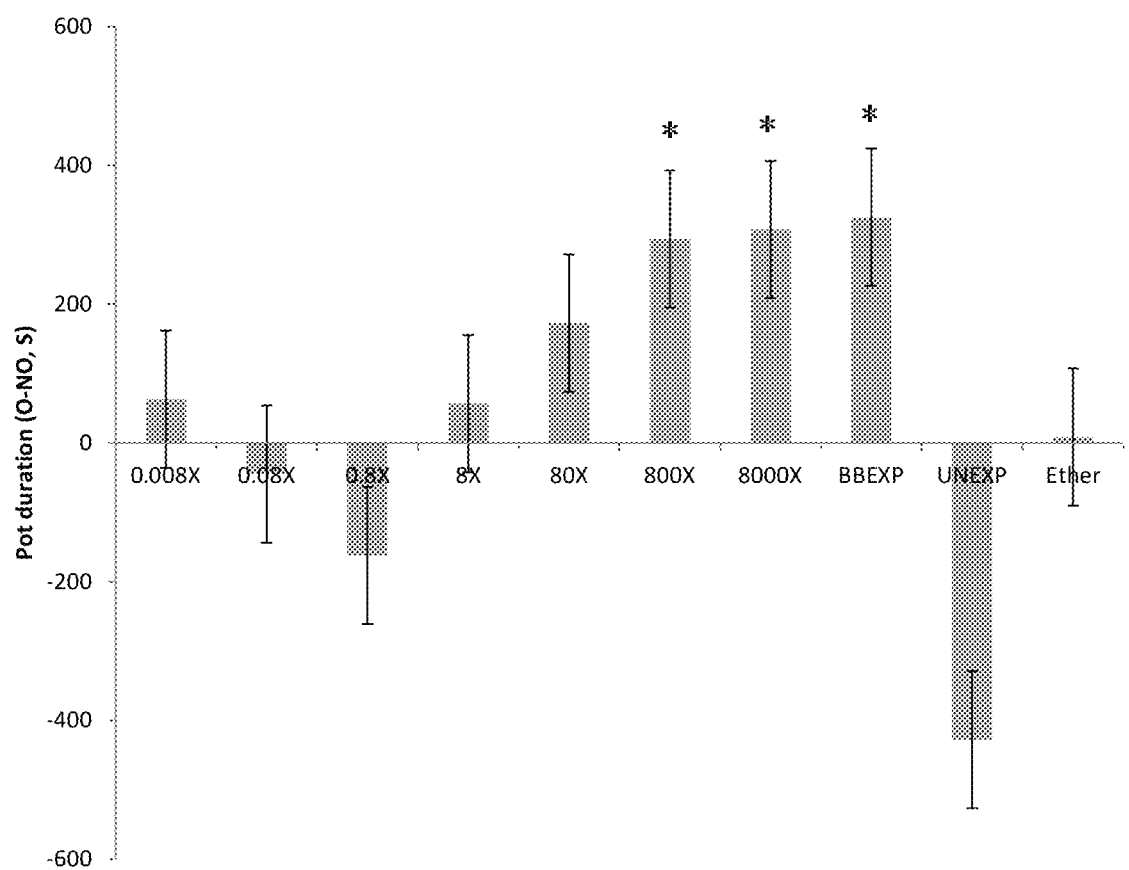
FIG. 11 shows time spent above pots (odour-no odour) for the dose response of (E)-2-octenal. BBEXP=Bed bug-exposed paper and UNEXP=Unexposed paper. * indicate significant compared to respective negative control.
Figure 12:
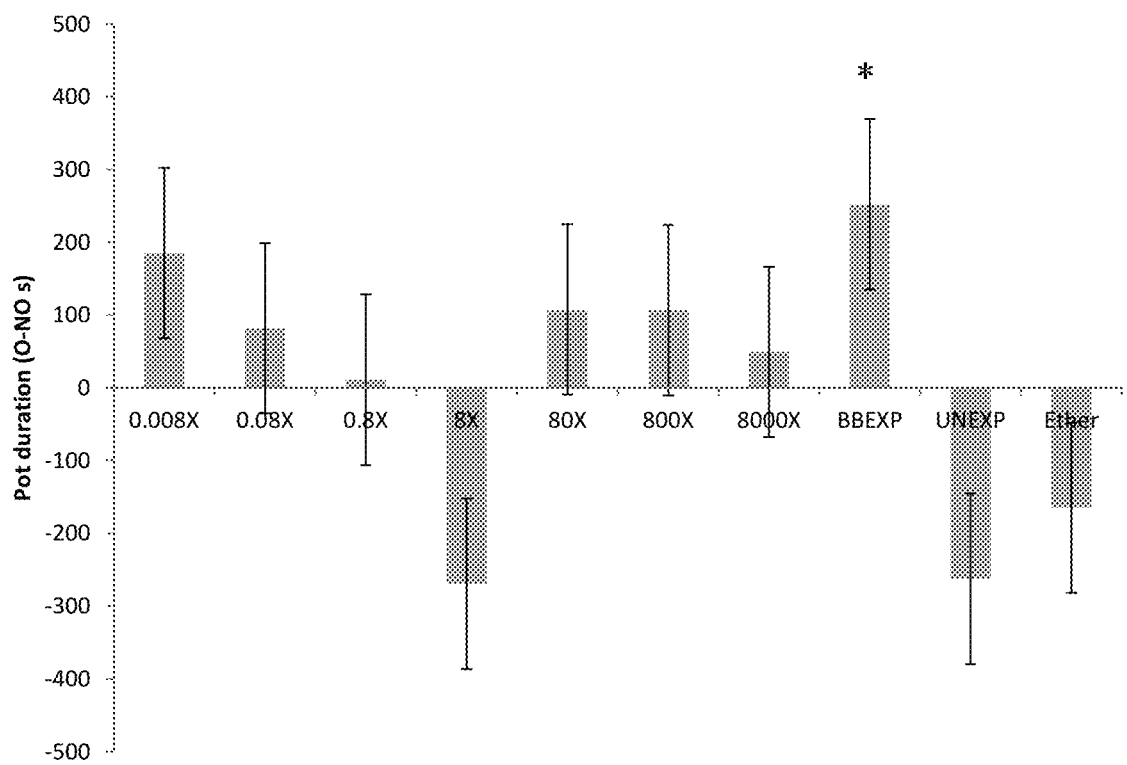
FIG. 12 shows time spent above pots (odour-no odour) for the dose response of (RS)-1-octen-3-ol. BBEXP=Bed bug-exposed paper and UNEXP=Unexposed paper. * indicate significant compared to respective negative control.
Figure 13:
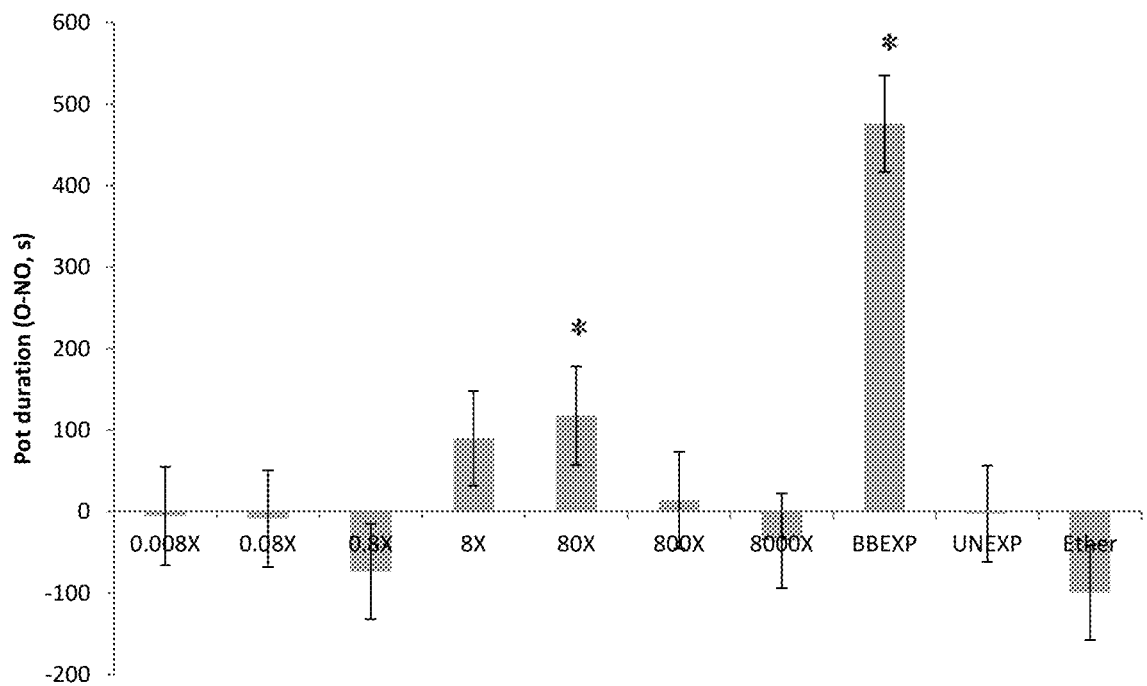
FIG. 13 shows time spent above pots (odour-no odour) for the dose response of nonanal. BBEXP=Bed bug-exposed paper and UNEXP=Unexposed paper. * indicate significant compared to respective negative control.
Figure 14:
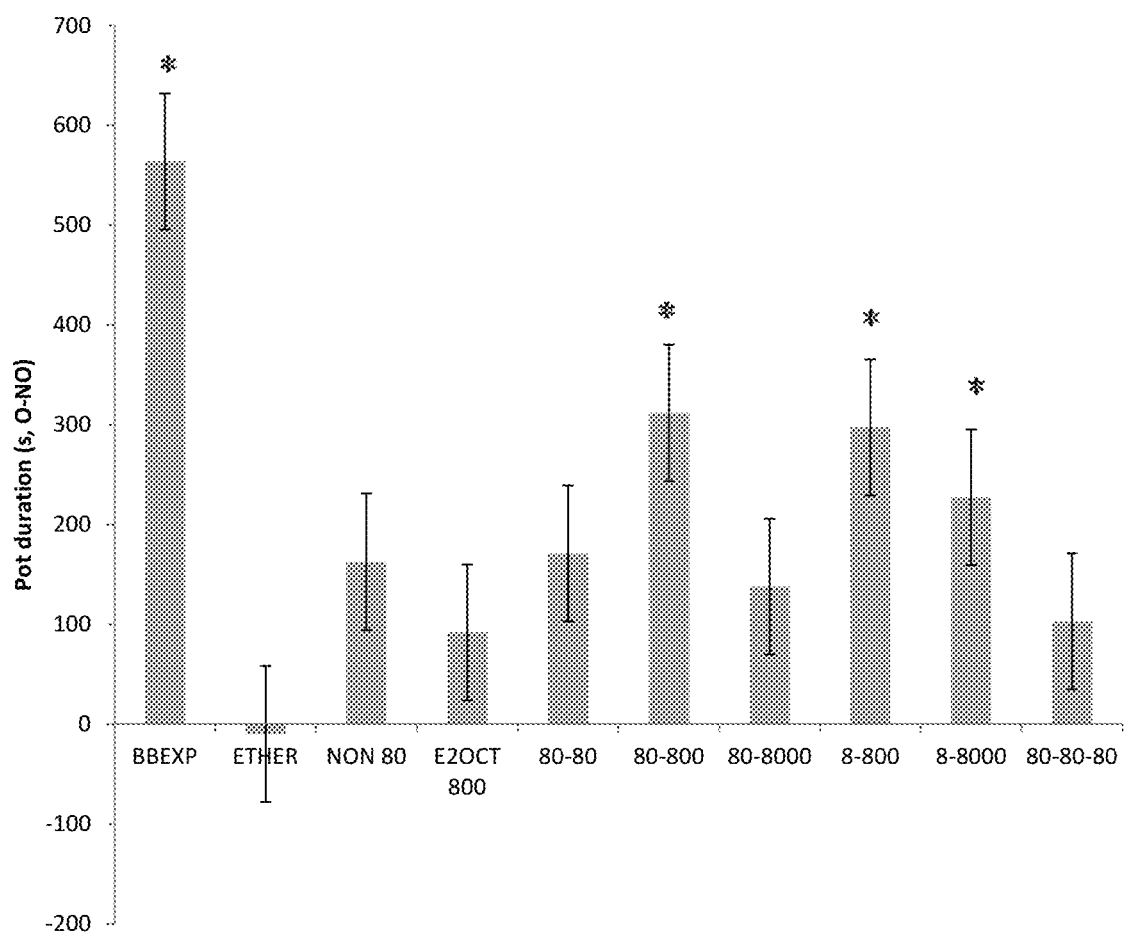
FIG. 14 shows time spent above pots (odour-no odour) for the refined synthetic blends of Example 9. BBEXP=Bed bug-exposed paper. * indicate significant compared to respective negative control (Ether).

Bed bugs responded to the volatiles from bed bug-exposed papers and there were significantly more visits to the odour pot (see FIG. 8; $F_{7,150}=2.78$, P=0.010) in the presence of the volatiles from bed bug-exposed paper (BBEXP) and the air entrainment extract (EXT 8%), when compared with negative solvent controls. There was no significant effect on the time spent in the odour zone dependent on treatment ($F_{7,151}=1.59$. P=0.143). The behaviour of bed bugs varied significantly in the presence of the bed bug-exposed paper (BBEXP) and the air entrainment extract (EXT 8%) as compared to the controls. There was also a trend towards increased visits to the odour pot due to the synthetic blend applied to filter paper (SB 8%) and rubber septa (FIG. 8a) and increased time spent in the odour zone due to the synthetic blend applied to rubber septa (FIG. 8b). The response of bed bugs to the volatiles released from the rubber septa was higher than the response to the volatiles released from filter paper treated with the same 18-component synthetic blend. There was also a trend towards increased time spent in the odour zone with increasing dose, from septa dose 3 to 1.

The proportion of bed bugs that failed to make a choice was low for most treatments (Table 7; <35%), except for when testing with the rubber septa treated with the redistilled diethyl ether (control septa), when the proportion of bed bugs that failed to make a choice was 50%. When investigating the first choice of bed bugs, there were differences between the treatments. For example, 86% of bed bugs chose to visit the odour pot first in the presence of the volatiles from bed bug-exposed paper (BBEXP), compared to only 39% during the negative control. There was preference for first visit to the odour pot in the presence of filter papers treated with volatile extract (60%) or synthetic blend (55%) or rubber septa treated with the synthetic blend, independent of dose.

Example 5: Summary of Chemical, Behavioural and Electrophysiological Analysis

The list of compounds identified in Examples 1 and 2 was examined for those compounds that are most likely to be attractive to bed bugs and be putative semiochemicals with respect to their chemistry and their behavioural and electrophysiological activity.

Results

The results are provided in Table 8. Compounds that have increased importance in respect of electrophysiology are those that resulted in more than 15 responses, followed by those with more than 10 responses, followed by those with more than 5 responses.

Octanal, (E)-2-octenal, nonanal, dodecane and unknown compounds 1 and 2 resulted in more than 15 responses.

Heptanal, (RS)-1-ocen-3-ol, octanal, 3-carene, β-phellandrene, (E)-2-octenal, (3E, 5E)-octadien-2-one, nonanal, (E)-2-nonenal, decanal, dodecane, nonanoic acid, 2-(2-butoxyethyoxy)ethyl acetate and (S)-(–)-germacrene D resulted in between 10 and 14 responses.

Hexanal, benzaldehyde, 2-decanone, (E)-2-undecenal and unknown compound 3 resulted in between 5 and 9 responses.

Based on these results, octanal, (E)-2-octenal, nonanal and (E)-2-nonenal were highlighted as being likely to be of high importance for attraction of bed bugs in view of their chemistry.

Example 6: Confirmation of Attraction to 18-Component Synthetic Blend

An experiment was completed to confirm that bed bugs were attracted to the 18 component synthetic blend and also to determine the correct dose to use as a control.

Methods: The behavioural bioassay was as described by Weeks et al. 2011 and recorded using EthoVision and the methodology described by Weeks et al. 2013. Each replicate was completed as a block of seven treatments including:
1. Ether (negative control)
2. Unexposed filter paper (negative control)
3. Bed bug-exposed paper (positive control)
4. 0.8×SB-18
5. 8×SB-18
6. 80×SB-18
7. 800×SB-18

The standard of natural volatiles is an 8% solution. Therefore, 0.8 means that it is 0.1 of standard volatiles, 8×=1× standard, 80×=10× standard and 800×=100× standard. For instance, an "8% solution" refers to an 8% dose of volatile extract (with the various different ratios of individual component. So 0.8× is 0.1 or a tenth of the component found in the standard of natural volatiles etc. (It does not mean that we are using an 8% solution of (E)-2-octenal and an 8% solution of nonanal).

In each block the order of the treatments and the position of the odour pot were randomized. 21 blocks were completed (n=21).

Results: The treatment, i.e. SB-18 (18 component synthetic blend) dose, had a significant effect on bed bug behaviour including the amount of time spent above the odour pot (FIG. 1; p=0.021). Only the 80×SB-18 and the bed bug-exposed paper were significant greater than zero and so bugs spent significantly more time above the odour pot. The 80×SB-18 was also significantly greater in odour pot duration than the ether control. The bed bug-exposed paper was significantly greater in odour pot duration than its control (paper).

Conclusion: A synthetic blend of 80× would be the best control.

Example 7: Subtraction Experiment

An experiment was completed to determine which of the 18 compounds were essential to a bed bug attracting synthetic blend.

Methods: The behavioural bioassay was as described by Weeks et al. 2011 and recorded using EthoVision and the methodology described by Weeks et al. 2013. 18 synthetic blends were tested, each blend lacked just one compound. To facilitate testing the experiment was split up into two groups of chemical subtractions completed independently with three controls in common. We used the standard of natural volatiles i.e. an 8% solution.

Group 1 comprised the following treatments:
1. SB-18 minus (3E,5E)-octadien-2-one
2. SB-18 minus (E)-2-octenal
3. SB-18 minus (RS)-1-octen-3-ol
4. SB-18 minus 3 carene
5. SB-18 minus benzaldehyde
6. SB-18 minus 1-phellandrene
7. SB-18 minus hepatanal
8. SB-18 minus hexanal
9. SB-18 minus octanal
10. SB-18 (control)
11. Ether (negative control)
12. Bed bug-exposed paper (positive control)

Group 2 comprised of the remaining treatments:
1. SB-18 minus dodecane
2. SB-18 minus (E)-2-undecenal
3. SB-18 minus (E)-2-nonenal
4. SB-18 minus nonanoic acid
5. SB-18 minus 2-decanone
6. SB-18 minus decanal
7. SB-18 minus (S)-germacrene-D
8. SB-18 minus 2-(2-butoxyethoxy)ethyl acetate
9. SB-18 minus nonanal
10. SB-18 (control)
11. Ether (negative control)
12. Bed bug-exposed paper (positive control)

In each block the order of the treatments and the position of the odour pot were randomized into two Latin squares of 11 blocks. 22 blocks were completed (n=22).

For statistical analysis the two groups were combined to enable all of the treatments to be compared.

Figure 2:
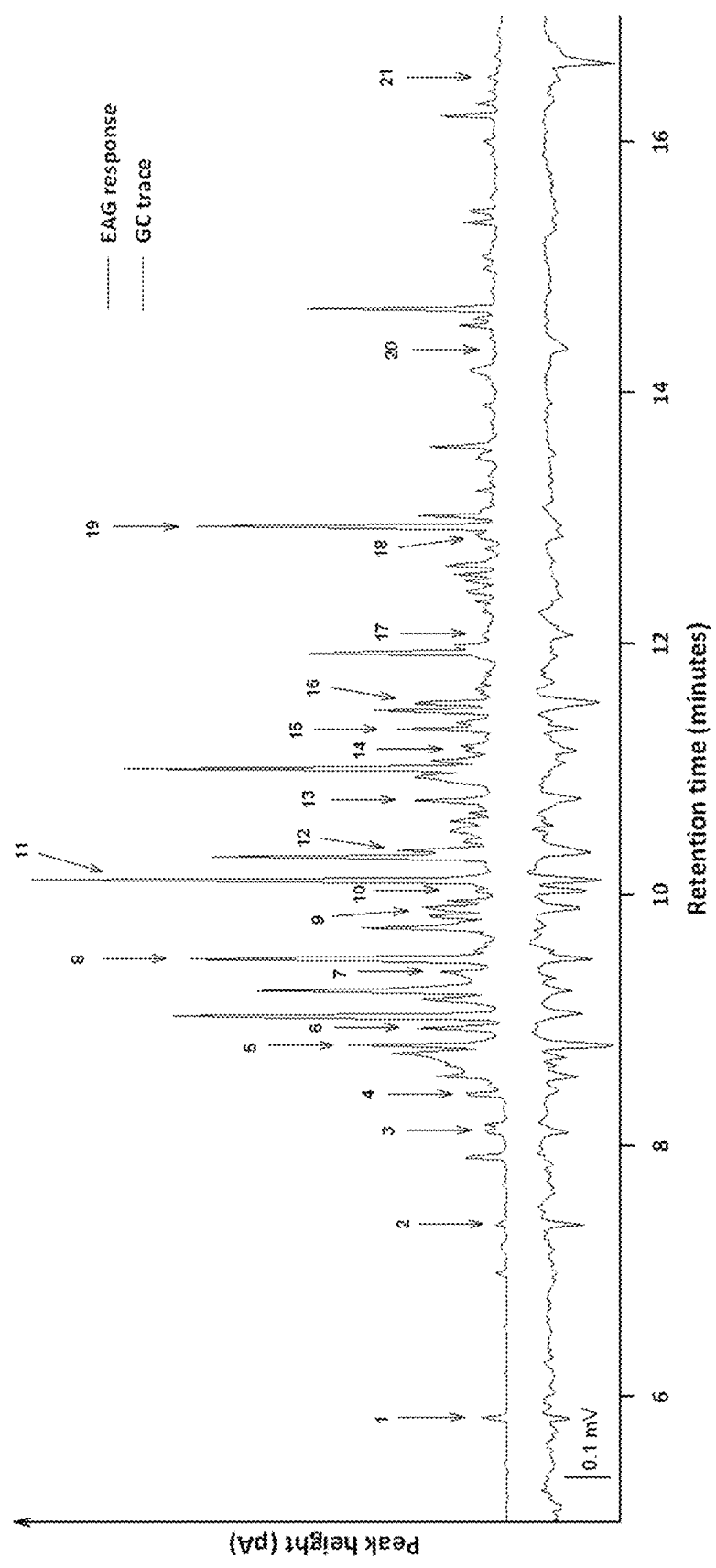

Results: The treatment, i.e. chemical subtracted from synthetic blend, had a significant effect on bed bug behaviour including the amount of time spent in the odour zone (FIG. 2; p=0.0004). Only the bed bug exposed paper, SB-18 minus (E)-2-octenal, SB-18 minus (RS)-1-octen-3-ol and SB-18 minus nonanal had significant differences in time spent in the odour zone compared to zero (no difference between odour and no odour). Bed bugs in the bed bug-exposed paper treatment spent significantly more time above the odour zone (p=0.0033). However, bed bugs in the (E)-2-octenal, (RS)-1-octen-3-ol and nonanal treatments spent significantly less time in the odour zone (p=0.0467; 0.0007; 0.0049, respectively). The same three SB-18 subtractions, SB-18 minus (E)-2-octenal, SB-18 minus (RS)-1-octen-3-ol and sb-18 minus nonanal, were also significantly less attractive than the negative control (p=0.0405; 0.0012; 0.0053, respectively)

Conclusion: Blends that were lacking in the compounds (E)-2-octenal, (RS)-1-octen-3-ol and nonanal were significantly less attractive than the negative control.

Example 8: Dose Responses of Individual Chemicals

The three chemicals. (E)-2-octenal, (RS)-1-octen-3-ol and nonanal, that were shown to be essential during the subtraction experiments were individually subjected to a dose response experiment.

Methods: The behavioural bioassay was as described by Weeks et al. 2011 and recorded using EthoVision and the methodology described by Weeks et al. 2013. For each chemical, (E)-2-octenal, (RS)-1-octen-3-ol and nonanal, seven doses were tested from 0.008× to 8000×, along with three controls. Each replicate was completed as a block of 10 treatments including:
1. Bed bug-exposed paper (positive control)
2. Unexposed filter paper (negative control)
3. Ether (negative control)
4. 0.008×
5. 0.08×
6. 0.8×
7. 8×
8. 80×
9. 800×
10. 8000×

We are referring here to either 0.001×, 0.01×, 0.1×, 1×, 10×, 100× or 1000× the dose of (E)-2-octenal found naturally in the aggregation pheromone. For instance, an "8% solution" refers to an 8% dose of volatile extract (with the various different ratios of individual component).

In each block the order of the treatments and the position of the odour pot were randomized. 10 blocks were completed for each chemical (n=10).

Results (E)-2-octenal

The treatment, i.e. concentration of (E)-2-octenal, had a significant effect on bed bug behaviour (FIG. 3; p<0.001). Only the bed bug-exposed paper, and 800× and 8000× doses, had a significantly greater duration above the odour pot than zero (p=0.0014; 0.0038; 0.0025, respectively). The same three treatments, bed bug-exposed paper, and 800× and 8000× doses, were also significantly more attractive than the corresponding negative control (p<0.0001; p=0.0434; p=0.345, respectively).

(RS)-1-octen-3-ol

Figure 4A:
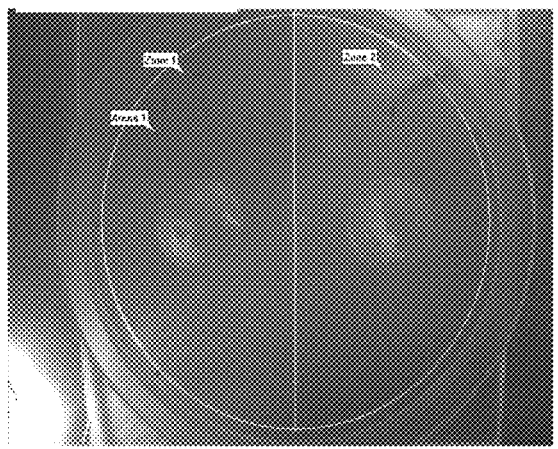
Figure 4B:
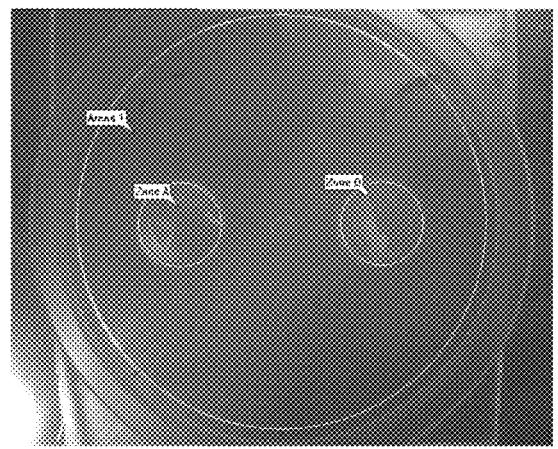

The treatment, i.e. concentration of (RS)-1-octen-3-ol, had a significant effect on bed bug behaviour (FIG. 4; p=0.0191). However, only the bed bug-exposed paper had a significantly higher duration above the odour pot than zero (p=0.035). A dose of 8× (RS)-1-octen-3-ol resulted in significantly less time spent above the odour pot than zero (p=0.0248) but none of the (RS)-1-octen-3-ol doses resulted in significantly more. When compared to the corresponding negative control, the bed bug-exposed paper was significantly greater in odour pot duration than its control (p=0.0029). The only dose of (RS)-1-octen-3-ol that was significantly different from the ether control in odour pot duration was the lowest dose tested 0.008×, which was significantly greater than the control (p=0.0381).

Nonanal

The treatment, i.e. concentration of nonanal had a significant effect on bed bug behaviour (FIG. 5; p<0.001). Only the bed bug-exposed paper had a significantly greater duration above the odour pot than zero (p<0.001). The pot duration that resulted from the treatment of a nonanal dose of 80× was borderline significantly greater than zero (p=0.0549). When comparing the doses of nonanal to the ether control, doses of 8× and 80× were significantly greater in odour pot duration (p=0.0237 and 0.0119, respectively). The bed bug-exposed paper was also significantly more attractive than its control, unexposed filter paper (p<0.0001).

Conclusion: A clear dose response was observed for (E)-2-octenal and nonanal but not (RS)-1-octen-3-ol. Further efforts should focus on these two chemicals for synthetic blends at the doses of 800-8000× for (E)-2-octenal and 8-80× for nonanal.

Example 9: Refined Synthetic Blends

The results of Experiment 8 demonstrated clear dose responses for (E)-2-octenal and nonanal, but less so for (RS)-1-octen-3-ol. Therefore, blends were tested that focused on the first two chemicals at the doses that caused significant behavioural responses in the bed bug in Experiment 8.

Methods:

The behavioural bioassay was as described by Weeks et al. 2011 and recorded using EthoVision and the methodology described by Weeks et al. 2013. Each replicate was completed as a block of 10 treatments including:
1. Bed bug-exposed paper (positive control)
2. Ether (negative control)
3. Nonanal 80×
4. E-2-octenal 800×
5. Nonanal 80× and E-2-octenal 80× (80-80)
6. Nonanal 80× and E-2-octenal 800× (80-800)
7. Nonanal 80× and E-2-octenal 8000× (80-8000)
8. Nonanal 8× and E-2-octenal 800× (8-800)
9. Nonanal 8× and E-2-octenal 8000× (8-8000)
10. Nonanal 80×, E-2-octenal 80× and 1-octen-3-ol 80× (80-80-80)

We are referring here to either 1×, 10×, 100× or 1000× the dose of Nonanal or (E)-2-octenal found naturally in the aggregation pheromone. For instance, an "8% solution" refers to an 8% dose of volatile extract (with the various different ratios of individual component).

Therefore, 8× means that it is 1 of standard volatiles, 8×=1× standard, 80×=10× standard and 800×=100× standard. 8000×=1000× standard. For instance, an "8% solution" refers to an 8% dose of volatile extract (with the various different ratios of individual component. So 8× is 1 or equal to the component found in the standard of natural volatiles etc. (It does not mean that we are using an 8% solution of (E)-2-octenal and an 8% solution of nonanal).

In each block the order of the treatments and the position of the odour pot were randomized. 18 blocks were completed.

Results:

The treatment, type of synthetic blend, was significant ($p<0.0001$). Compared to zero the bed bug-exposed paper, nonanal 80, 80-80, 80-800, 80-8000, 8-800 and 8-8000 were all significantly greater in time spent above the odour pot in the odour zone (zone duration). Only the bed bug-exposed paper, 80-800, 8-800 and 8-8000 were significantly greater in time spent above the odour pot (pot duration) compared to the control, see Table 9. The (E)-2-octenal 800 treatment was significantly lower in time spent over the odour pot than 80-800 and 8-800. 80-800 and 8-800 were significantly greater in time spent over the odour pot than the 3 component blend 80-80-80.

TABLE 9

Summary data comparing p-values of different refined synthetic blends for two variables.

| NONANAL | E-2-OCTENAL | OCTANAL | ZONE DURATION | POT DURATION |
|---|---|---|---|---|
| 80 | 0 | 0 | 0.0411 | 0.0655 |
| 0 | 800 | 0 | 0.1930 | 0.2743 |
| 80 | 80 | 0 | 0.0107 | 0.0530 |
| 80 | 800 | 0 | 0.0117 | 0.0007 |
| 80 | 8000 | 0 | 0.0170 | 0.1134 |
| 8 | 800 | 0 | 0.0708 | 0.0012 |
| 8 | 8000 | 0 | 0.0117 | 0.0115 |
| 80 | 80 | 80 | 0.0353 | 0.2252 |

Significantly different blends compared with solvent control are in bold text considering an α of 0.05.

Conclusion: In order to achieve a response that was significantly different from the ether control it was necessary to use a blend, comprising either 8× or 80× nonanal and 800× or 8000× (E)-2-octenal.

REFERENCES

Weeks, E. N. I., Logan, J. G., Gezan, S. A., Woodcock, C. M., Birkett, M. A., Pickett, J. A., & Cameron, M. M. (2011) A bioassay for studying the behavioural responses of the common bed bug, *Cimex lectularius* (Hemiptera: Cimicidae) to bed bug-derived volatiles. *Bulletin of Entomological Research*, 101, 1-8.

Weeks. E. N. I., Logan, J. G., Birkett, M. A., Pickett, J. A. and Cameron, M. M. (2013) Tracking bed bugs (*Cimex lectularius*): a study of the effect of physiological and extrinsic factors on the response to bed bug-derived volatiles Journal of Experimental Biology 216: 460-469

TABLE 8

Electrophysiological data showing number of responses to EAG active compounds

| | | | Electrophysiology | | | Behavioural testing | |
|---|---|---|---|---|---|---|---|
| | | | Visual inspection (no of responses) | | Auto | | |
| Peak | Compound ID | Response | >5 | >10 | >15 | method | Active 18 | Active 16 |
| 1 | Hexanal | 9 | • | | | | • | • |
| 2 | Heptanal | 13 | • | • | | • | • | • |
| 3 | Benzaldehyde | 8 | • | | | | • | • |
| 4 | (RS)-1-Octen-3-ol | 11 | • | • | | | • | • |
| 5 | Octanal | 19 | • | • | • | • | • | • |
| 6 | 3-Carene | 11 | • | • | | | • | • |
| 7 | β-Phellandrene | 11 | • | • | | | • | • |
| 8 | (E)-2-octenal | 16 | • | • | • | • | • | • |
| 9 | (3E,5E)-Octadien-2-one | 13 | • | • | | | • | • |

TABLE 8-continued

Electrophysiological data showing number of responses to EAG active compounds

| Peak | Compound ID | Response | >5 | >10 | >15 | Auto method | Active 18 | Active 16 |
|---|---|---|---|---|---|---|---|---|
| 10 | Unknown 1 | 17 | • | • | • | • | | |
| 11 | Nonanal | 17 | • | • | • | • | • | • |
| 12 | Unknown 2 | 17 | • | • | • | • | | |
| 13 | (E)-2-Nonenal | 13 | • | • | | • | • | • |
| 14 | 2-Decanone | 9 | • | | | | • | • |
| 15 | Decanal | 12 | • | • | | | • | • |
| 16 | Dodecane | 16 | • | • | • | • | • | • |
| 17 | Nonanoic acid | 12 | • | • | | | • | • |
| 18 | 2-(2-Butoxyethoxy)-acetate ethanol | 12 | • | • | | | • | • |
| 19 | (E)-2-Undecenal | 9 | • | | | | • | • |
| 20 | (S)-(−)-Germacrene D | 14 | • | • | | | • | |
| 21 | Unknown 3 | 7 | • | | | | • | • |
| | Total | | 21 | 16 | 6 | 9 | 18 | 16 |

The invention claimed is:

1. An attractant composition for bed bugs of the genus *Cimex* consisting of
   (a) (E)-2-octenal,
   (b) nonanal, and,
   (c) optionally, a carrier and/or a preservative,
   wherein the amount of (E)-2-octenal is greater than 0.384 times a concentration of nonanal.

2. The composition of claim 1, wherein the amount of (E)-2-octenal is at least 3.84 times the concentration of nonanal.

3. The composition of claim 2 wherein the amount of (E)-2-octenal is at least 38.4 times the concentration of nonanal.

4. The composition of claim 3 wherein the amount of (E)-2-octenal is at least 384 times the concentration of nonanal.

5. The composition of claim 1, wherein the composition consists of:
   (a) (E)-2-octenal,
   (b) nonanal,
   (c) a carrier, and
   (d) optionally a preservative.

6. A method of attracting bed bugs of the genus *Cimex*, comprising:
   providing the composition according to claim 1 to a surface.

7. The method of claim 6, wherein the method detects the bed bugs, and the method comprises:
   1) attracting the bed bugs to the surface with the composition; and
   2) detecting bed bugs attracted to said composition.

8. The method of claim 7, wherein the method monitors bed bug populations, and wherein step 2) is repeated after a selected time interval.

9. The method of claim 8, wherein the method measures efficacy of treatment for bed bug infestation, wherein step 1) and step 2) are performed pre-treatment, and step 2) is repeated post-treatment.

10. The method of claim 6, wherein the method reduces or eliminates a bed bug population, wherein the method comprises:
    1) attracting the bed bugs to the surface of a trapping means with the composition; and
    2) trapping said bed bugs with said trapping means.

11. The method of claim 6, wherein the method reduces or eliminates a bed bug population, wherein the method comprises:
    1) attracting the bed bugs to the surface with the composition; and
    2) contacting said bed bugs with a bed bug pathogen.

12. The method of claim 6, wherein the method reduces or eliminates a bed bug population, wherein the method comprises attracting the bed bugs to the surface with the composition, wherein the surface is treated with a toxin.

13. A device for attracting bed bugs of the genus *Cimex*, comprising an attractant element, wherein the attractant element comprises the composition of claim 1.

14. The device of claim 13, additionally comprising a bed bug pathogen.

15. The method of claim 12, wherein the toxin comprises an insecticide or other substance toxic to bed bugs.

* * * * *